United States Patent
Lee et al.

(10) Patent No.: US 11,070,981 B2
(45) Date of Patent: Jul. 20, 2021

(54) INFORMATION PROTECTION TO DETECT FAKE BASE STATIONS

(71) Applicant: QUALCOMM Incorporated, San Diego, CA (US)

(72) Inventors: Soo Bum Lee, San Diego, CA (US); Ozcan Ozturk, San Diego, CA (US); Gavin Bernard Horn, La Jolla, CA (US); Adrian Edward Escott, Reading (GB); Anand Palanigounder, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/743,927

(22) Filed: Jan. 15, 2020

(65) Prior Publication Data
US 2020/0236554 A1 Jul. 23, 2020

Related U.S. Application Data

(60) Provisional application No. 62/794,491, filed on Jan. 18, 2019, provisional application No. 62/839,500, filed on Apr. 26, 2019.

(51) Int. Cl.
*H04W 76/10* (2018.01)
*H04W 12/10* (2021.01)
(Continued)

(52) U.S. Cl.
CPC .......... *H04W 12/10* (2013.01); *H04W 12/03* (2021.01); *H04W 12/06* (2013.01); *H04W 76/10* (2018.02)

(58) Field of Classification Search
CPC .......... H04W 12/00; H04W 12/00506; H04W 12/1008; H04W 12/001; H04W 12/06;
(Continued)

(56) References Cited

U.S. PATENT DOCUMENTS 9,412,278 B1 * 8/2016 Gong ................... G08G 5/0091
2007/0032249 A1 * 2/2007 Krishnamurthi ...... H04W 64/00
455/456.1
(Continued)

OTHER PUBLICATIONS

3rd Generation Partnership Project; Technical Specification Group Services and System Aspects; Study on the Security Aspects of the Next Generation System (Release 14), 3GPP Standard; S3-172095, Technical Report; 3GPP TR 33.899, 3rd Generation Partnership Project (3GPP), Mobile Competence Centre; 650, Route Des Lucioles; F-06921 Sophia-Antipolis Cedex; France, vol. SA WG3, No. v1.3.0, Aug. 21, 2017, 605 pages, XP051450230,Retrieved from the Internet: URL: http://www.3gpp.org/ftp/tsg_sa/WG3_Security/TSGS3_88_Dali/Docs/ [retrieved on Aug. 21, 2017] the whole document.
(Continued)

*Primary Examiner* — Jean A Gelin

(57) ABSTRACT

Methods, systems, and devices for wireless communications are described. In some systems, devices may use information protection to detect fake base stations. A base station verified by a network may transmit first information to a user equipment (UE) in an unprotected message. If a fake base station intercepts and modifies the message before relaying the message to the UE, the UE may receive different information than the transmitted first information. The UE may then transmit an indication of the received information to the verified base station in a protected message. In some cases, based on the indication, the verified base station may re-transmit the first information to the UE in a message protected against modification by the fake base station. If the UE determines that the initially received information is different from the information received in the protected retransmission, the UE identifies message modification by the fake base station.

28 Claims, 16 Drawing Sheets

(51) Int. Cl.
*H04W 12/06* (2021.01)
*H04W 12/03* (2021.01)

(58) Field of Classification Search
CPC . H04W 12/10; H04W 12/12; H04W 12/1202; H04W 76/10; H04W 12/0051
See application file for complete search history.

(56) References Cited

U.S. PATENT DOCUMENTS

| | | | | |
|---|---|---|---|---|
| 2008/0039096 | A1* | 2/2008 | Forsberg | H04W 12/1006 455/438 |
| 2009/0199272 | A1* | 8/2009 | Gopalakrishna | H04L 63/0838 726/3 |
| 2010/0211790 | A1* | 8/2010 | Zhang | H04L 9/3297 713/171 |
| 2013/0083691 | A1* | 4/2013 | Murphy | H04L 41/0886 370/254 |
| 2015/0215777 | A1* | 7/2015 | Sirotkin | H04L 63/062 455/411 |
| 2018/0046824 | A1* | 2/2018 | Rajadurai | H04L 61/2092 |
| 2018/0070238 | A1 | 3/2018 | Agarwal et al. | |
| 2018/0124697 | A1* | 5/2018 | Nair | H04W 72/0406 |
| 2018/0167918 | A1 | 6/2018 | Ishii | |
| 2019/0182286 | A1* | 6/2019 | Zini | H04L 61/256 |
| 2019/0191483 | A1* | 6/2019 | Ryoo | H04W 76/10 |
| 2019/0268759 | A1* | 8/2019 | Targali | H04W 12/08 |
| 2019/0349765 | A1* | 11/2019 | Kolekar | H04L 63/0876 |
| 2020/0162925 | A1* | 5/2020 | Miao | H04W 12/00502 |
| 2020/0344605 | A1 | 10/2020 | Lee et al. | |

OTHER PUBLICATIONS

Intel Corporation: "Discussion on Security Issues with RRC Reject for Inactive Mode", 3GPP Draft, 3GPP TSG SA WG3 (Security) Meeting #89, S3-173211_DISCUSSIONRRCREJECTWAIT-TIMER, 3rd Generation Partnership Project (3GPP), Mobile Competence Centre, 650, Route Des Lucioles, F-06921 Sophia-Antipolis Cedex, France, vol. SA WG3, No. Reno USA, 20171127-20171201, Nov. 20, 2017 (Nov. 20, 2017), XP051380467, 2 Pages, Retrieved from the Internet: URL: http://www.3gpp.org/ftp/tsg%5Fsa/WG3%5FSecurity/TSGS3%5F89%5FReno/Docs/, [retrieved on Nov. 20, 2017], the whole document.

International Search Report and Written Opinion—PCT/US2020/013904—ISAEPO—dated Apr. 14, 2020.

LG Electronics: "Verification of System Information", 3GPP Draft, 3GPP TSG SA WG3 #46, S3-070075 Verification of System Information, 3rd Generation Partnership Project (3GPP), Mobile Competence Centre, 650, Route Des Lucioles, F-06921 Sophia-Antipolis Cedex, France, vol. SA WG3, No. Beijing, China, 20070213-20070216, Feb. 9, 2007 (Feb. 9, 2007), XP050635364, pp. 1-6, [retrieved on Feb. 9, 2007], the whole document.

Huawei., et al., "Measurement Report Requirement when UE in RRC-Connected,",3GPP Draft; 3GPP TSG SA WG3 (Security) Meeting #94 ad-hoc, S3-190671, 3RD Generation Partnership Project (3GPP), Mobile Competence Centre, 650, Route Des Lucioles, F-06921, Sophia-Antipolis Cedex, France, vol. SA WG3, No. Kista (Sweden); 20190311-20190315, Mar. 4, 2019 (Mar. 4, 2019), XP051697606, 2 pages, Retrieved from the Internet:URL: http://www.3gpp.org/ftp/tsg%5Fsa/WG3%5FSecurity/TSGS3%5F94AH%5FKista/Docs/S3%2D190671%2Ezip [retrieved on Mar. 4, 2019]the whole document.

Qualcomm Incorporated: "Shared Key Based MIB/SIBs Integrity Information Provided by gNB", 3GPP Draft, 3GPP TSG SA WG3 (Security) Meeting #96, S3-192936, 3RD Generation Partnership Project (3GPP), Mobile Competence Centre, 650, Route Des Lucioles, F-06921, Sophia-Antipolis Cedex, France, vol. SA WG3, No. Wroclaw (Poland), 20190826-20190830, Aug. 19, 2019 (Aug. 19, 2019), XP051776769, 3 pages, Retrieved from the Internet: URL: http://www.3gpp.org/ftp/tsg_sa/WG3_Security/TSGS3_96_Wroclaw/Docs/S3-192936.zip [retrieved on Aug. 19, 2019] the whole document.

* cited by examiner

INFORMATION PROTECTION TO DETECT FAKE BASE STATIONS

CROSS REFERENCE

The present Application for Patent claims the benefit of U.S. Provisional Patent Application Ser. No. 62/794,491 by LEE et al., entitled "INFORMATION PROTECTION TO DETECT FAKE BASE STATIONS," filed Jan. 18, 2019, and of U.S. Provisional Patent Application Ser. No. 62/839,500 by LEE et al., entitled "DETECTION OF SYSTEM INFORMATION MODIFICATION USING ACCESS STRATUM SECURITY MODE COMMAND," filed Apr. 26, 2019, each of which is assigned to the assignee hereof, and each of which is expressly incorporated herein.

BACKGROUND

The following relates generally to wireless communications, and more specifically to information protection to detect fake base stations.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications systems, a UE may process a number of messages (e.g., broadcast messages, unicast messages) prior to setting up a security context with the network. These messages may be referred to as "unprotected" messages, as these messages received prior to establishing the security context may lack protection via ciphering, integrity protection, or both. In some cases, a UE may connect to and receive unprotected messages from a "fake" base station. A "fake" base station may refer to a wireless device acting as if it is part of a network despite not being verified by the network. In some examples, the fake base station may launch different types of attacks against the UE using these unprotected messages (e.g., by modifying downlink messages from a base station verified by the network). These attacks may degrade performance at the UE, deny service to the UE, prevent the UE from receiving important information, cause roaming issues at the UE, or result in any combination of these or other problems based on malicious modifications made by the fake base station to information contained in one or more unprotected messages.

SUMMARY

The described techniques relate to improved methods, systems, devices, and apparatuses that support information protection to detect fake base stations. Generally, the described techniques provide for a user equipment (UE) to determine the authenticity of information (e.g., system information) received in an unprotected message (e.g., a message not protected via ciphering, integrity protection, or both). In some wireless communications systems, a base station verified by a network may transmit a first set of information to a UE in an unprotected message. If a fake base station intercepts and modifies the message before relaying the message to the UE, the UE may receive different information (e.g., a second set of information) than the transmitted first set of information. The UE and the verified base station may complete a security setup procedure between the UE and the verified base station, after which the UE may transmit an indication of the received second set of information to the verified base station in a protected (e.g., ciphered, integrity protected, or both) message. The UE may protect the message (e.g., encrypt and integrity protect the message) based on the security setup between the UE and the verified base station. In some cases, based on the indication, the verified base station may re-transmit the first set of information to the UE in a message protected against modification by the fake base station (e.g., using ciphering, integrity protection). If the UE determines that the initially received information is different from the information received in the protected re-transmission, the UE may identify that the message was modified by a fake base station. Based on this detection of the fake base station, the UE may detach from the fake base station and reattach to a different base station in order to communicate with the network.

Additionally or alternatively, once the UE registers with the network (e.g., once the UE has a valid non-access stratum (NAS) security context), the network may provision the UE with a UE-specific key, a key index, an initial access stratum (AS) security protection algorithm, or some combination thereof for securing an initial AS message. The UE may use this UE-specific key to security protect an indication of received information in an initial AS transmission to a base station of the network. The network may additionally provision the base station with information (e.g., a master key, the key index, the initial AS security protection algorithm) that supports decryption of the indication. The base station may determine whether to re-transmit the information to the UE in a protected message based on the received indication. The UE may determine inauthentic information and detect a fake base station if the protected information received in the re-transmission is different from the information (e.g., the inauthentic information) initially received at the UE.

A method for wireless communications at a UE is described. The method may include receiving, from a base station, a first set of information associated with communicating with a network, where the first set of information lacks protection via ciphering, integrity protection, or a combination thereof, and transmitting, to the base station, an indication of the first set of information, where the indication is protected via ciphering, integrity protection, or a combination thereof. The method may further include determining authenticity of the first set of information based on whether a second set of information associated with communicating with the network is received from the base station that is different from the first set of information and communicating with the network based on the determining.

An apparatus for wireless communications at a UE is described. The apparatus may include a processor, memory in electronic communication with the processor, and instructions stored in the memory. The instructions may be executable by the processor to cause the apparatus to receive, from a base station, a first set of information associated with communicating with a network, where the first set of information lacks protection via ciphering, integrity protection, or a combination thereof, and transmit, to the base station, an indication of the first set of information, where the indication is protected via ciphering, integrity protection, or a combination thereof. The instructions may further be executable by the processor to cause the apparatus to determine authenticity of the first set of information based on whether a second set of information associated with communicating with the network is received from the base station that is different from the first set of information and communicate with the network based on the determining.

Another apparatus for wireless communications at a UE is described. The apparatus may include means for receiving, from a base station, a first set of information associated with communicating with a network, where the first set of information lacks protection via ciphering, integrity protection, or a combination thereof, and transmitting, to the base station, an indication of the first set of information, where the indication is protected via ciphering, integrity protection, or a combination thereof. The apparatus may further include means for determining authenticity of the first set of information based on whether a second set of information associated with communicating with the network is received from the base station that is different from the first set of information and communicating with the network based on the determining.

A non-transitory computer-readable medium storing code for wireless communications at a UE is described. The code may include instructions executable by a processor to receive, from a base station, a first set of information associated with communicating with a network, where the first set of information lacks protection via ciphering, integrity protection, or a combination thereof, and transmit, to the base station, an indication of the first set of information, where the indication is protected via ciphering, integrity protection, or a combination thereof. The code may further include instructions executable by the processor to determine authenticity of the first set of information based on whether a second set of information associated with communicating with the network is received from the base station that is different from the first set of information and communicate with the network based on the determining.

Some examples of the method, apparatuses, and non-transitory computer-readable medium described herein may further include operations, features, means, or instructions for receiving, from the base station, the second set of information, where the second set of information is protected via ciphering, integrity protection, or a combination thereof, and comparing the second set of information with the first set of information, where the determining may be based on the comparing. In some examples of the method, apparatuses, and non-transitory computer-readable medium described herein, the second set of information may be received in a radio resource control (RRC) re-configuration message.

In some examples of the method, apparatuses, and non-transitory computer-readable medium described herein, the first set of information includes a first master information block (MIB), a first set of system information blocks (SIBs), or a combination thereof, and the second set of information includes a second MIB, a second set of SIBs, or a combination thereof.

In some examples of the method, apparatuses, and non-transitory computer-readable medium described herein, the indication may include a hash value based on the first set of information and a system frame number (SFN) value associated with the first set of information. Some examples of the method, apparatuses, and non-transitory computer-readable medium described herein may further include operations, features, means, or instructions for receiving, from the base station, the second set of information if the second set of information is different from the first set of information.

In some examples of the method, apparatuses, and non-transitory computer-readable medium described herein, the indication may include a request for the second set of information. Some examples of the method, apparatuses, and non-transitory computer-readable medium described herein may further include operations, features, means, or instructions for receiving, from the base station, the second set of information based on the request for the second set of information.

In some examples of the method, apparatuses, and non-transitory computer-readable medium described herein, the UE is an unregistered UE without a valid NAS security context and the indication of the first set of information is transmitted in an AS security mode complete message.

Some examples of the method, apparatuses, and non-transitory computer-readable medium described herein may further include operations, features, means, or instructions for receiving a UE-specific key for an initial AS message, where the UE-specific key may be based on one or more identifiers of the UE.

In some examples of the method, apparatuses, and non-transitory computer-readable medium described herein, the UE is a registered UE with a valid NAS security context. In some cases, transmitting the indication of the first set of information may include operations, features, means, or instructions for security protecting the indication of the first set of information based on the UE-specific key, where the security protecting includes encrypting the indication of the first set of information, integrity protecting the indication of the first set of information, or a combination thereof.

In some examples of the method, apparatuses, and non-transitory computer-readable medium described herein, security protecting the indication of the first set of information based on the UE-specific key further may include operations, features, means, or instructions for deriving a temporary encryption key for the initial AS message based on the UE-specific key, a pseudo-random number, an algorithm identifier, or a combination thereof, encrypting the indication of the first set of information using the temporary encryption key and an SFN value associated with the first set of information, and transmitting, to the base station, an indication of the SFN value and the pseudo-random number, the algorithm identifier, or a combination thereof.

Some examples of the method, apparatuses, and non-transitory computer-readable medium described herein may further include operations, features, means, or instructions for receiving an updated UE-specific key for the initial AS message, where the updated UE-specific key may be based on the one or more identifiers of the UE, a key index, or a combination thereof. In some examples of the method, apparatuses, and non-transitory computer-readable medium described herein, the indication of the first set of information may be transmitted in an RRC connection message.

Some examples of the method, apparatuses, and non-transitory computer-readable medium described herein may further include operations, features, means, or instructions for receiving a key index value associated with the UE-specific key and transmitting the key index value with the indication of the first set of information.

Some examples of the method, apparatuses, and non-transitory computer-readable medium described herein may further include operations, features, means, or instructions for detecting an additional base station, transmitting, to the additional base station, an initial RRC connection setup message indicating detection of the additional base station, where the initial RRC connection setup message may be security protected based on the UE-specific key, and determining whether the additional base station is an authorized base station of the network based on the initial RRC connection setup message.

In some examples of the method, apparatuses, and non-transitory computer-readable medium described herein, the one or more identifiers of the UE include a globally unique temporary identity (GUTI), a serving temporary mobile subscriber identity (S-TMSI), a temporary mobile subscriber identity (TMSI), or a combination thereof. In some examples of the method, apparatuses, and non-transitory computer-readable medium described herein, the UE-specific key may be received in a secure NAS message.

In some examples of the method, apparatuses, and non-transitory computer-readable medium described herein, the determining includes operations, features, means, or instructions for determining that the first set of information is authentic and the communicating includes operations, features, means, or instructions for communicating with the network via the base station based on the determining that the first set of information is authentic.

In some examples of the method, apparatuses, and non-transitory computer-readable medium described herein, the determining includes operations, features, means, or instructions for determining that the first set of information is inauthentic, and the communicating includes operations, features, means, or instructions for detaching from the base station based on the determining that the first set of information is inauthentic, reattaching to an additional base station, and communicating with the network via the additional base station. Some examples of the method, apparatuses, and non-transitory computer-readable medium described herein may further include operations, features, means, or instructions for reporting, to the additional base station, an identity of the base station, at least a portion of the first information, or a combination thereof based on the determining that the first set of information is inauthentic.

Some examples of the method, apparatuses, and non-transitory computer-readable medium described herein may further include operations, features, means, or instructions for receiving, from the base station, an indication that security protection for the first set of information is enabled. In some examples of the method, apparatuses, and non-transitory computer-readable medium described herein, the indication that security protection for the first set of information is enabled may be received in a NAS security mode command message.

In some examples of the method, apparatuses, and non-transitory computer-readable medium described herein, the indication of the first set of information is integrity protected.

A method for wireless communications at a base station is described. The method may include transmitting, to a UE, a first set of information associated with communicating with a network, where the first set of information lacks protection via ciphering, integrity protection, or a combination thereof, and receiving, from the UE, an indication of a second set of information received at the UE and associated with communicating with the network, where the indication is protected via ciphering, integrity protection, or a combination thereof. The method may further include determining whether to re-transmit, to the UE, the first set of information in a protected message based on the indication of the second set of information, where the protected message is protected via ciphering, integrity protection, or a combination thereof, and communicating with the UE based on whether the first set of information is different from the second set of information.

An apparatus for wireless communications at a base station is described. The apparatus may include a processor, memory in electronic communication with the processor, and instructions stored in the memory. The instructions may be executable by the processor to cause the apparatus to transmit, to a UE, a first set of information associated with communicating with a network, where the first set of information lacks protection via ciphering, integrity protection, or a combination thereof, and receive, from the UE, an indication of a second set of information received at the UE and associated with communicating with the network, where the indication is protected via ciphering, integrity protection, or a combination thereof. The instructions may be further executable by the processor to cause the apparatus to determine whether to re-transmit, to the UE, the first set of information in a protected message based on the indication of the second set of information, where the protected message is protected via ciphering, integrity protection, or a combination thereof, and communicate with the UE based on whether the first set of information is different from the second set of information.

Another apparatus for wireless communications at a base station is described. The apparatus may include means for transmitting, to a UE, a first set of information associated with communicating with a network, where the first set of information lacks protection via ciphering, integrity protection, or a combination thereof, and receiving, from the UE, an indication of a second set of information received at the UE and associated with communicating with the network, where the indication is protected via ciphering, integrity protection, or a combination thereof. The apparatus may further include means for determining whether to re-transmit, to the UE, the first set of information in a protected message based on the indication of the second set of information, where the protected message is protected via ciphering, integrity protection, or a combination thereof, and communicating with the UE based on whether the first set of information is different from the second set of information.

A non-transitory computer-readable medium storing code for wireless communications at a base station is described. The code may include instructions executable by a processor to transmit, to a UE, a first set of information associated with communicating with a network, where the first set of information lacks protection via ciphering, integrity protection, or a combination thereof, and receive, from the UE, an indication of a second set of information received at the UE and associated with communicating with the network, where the indication is protected via ciphering, integrity protection, or a combination thereof. The code may further include instructions executable by the processor to determine whether to re-transmit, to the UE, the first set of information in a protected message based on the indication of the second set of information, where the protected message is protected via ciphering, integrity protection, or a combination thereof, and communicate with the UE based on whether the first set of information is different from the second set of information.

In some examples of the method, apparatuses, and non-transitory computer-readable medium described herein, the first set of information includes a first MIB, a first set of SIBs, or a combination thereof, and the second set of information includes a second MIB, a second set of SIBs, or a combination thereof.

In some examples of the method, apparatuses, and non-transitory computer-readable medium described herein, the indication of the second set of information may include a hash value based on the second set of information and an SFN value associated with the second set of information. Some examples of the method, apparatuses, and non-transitory computer-readable medium described herein may further include operations, features, means, or instructions for identifying the second set of information based on the hash value and determining to re-transmit, to the UE, the first set of information in the protected message if the second set of information is different from the first set of information.

In some examples of the method, apparatuses, and non-transitory computer-readable medium described herein, the indication of the second set of information may include a request for the second set of information, where the first set of information corresponds to the second set of information. Some examples of the method, apparatuses, and non-transitory computer-readable medium described herein may further include operations, features, means, or instructions for re-transmitting, to the UE, the first set of information in the protected message based on the request.

In some examples of the method, apparatuses, and non-transitory computer-readable medium described herein, the UE is an unregistered UE without a valid NAS security context and the indication of the second set of information may be received in an AS security mode complete message.

Some examples of the method, apparatuses, and non-transitory computer-readable medium described herein may further include operations, features, means, or instructions for forwarding, from a network entity of the network to the UE, a UE-specific key for an initial AS message.

Some examples of the method, apparatuses, and non-transitory computer-readable medium described herein may further include operations, features, means, or instructions for receiving, from the network entity, a master key for the initial AS message, receiving, from the UE, the initial AS message, where the initial AS message may be protected based on the UE-specific key, and deriving the UE-specific key using the master key and one or more identifiers of the UE based on receiving the initial AS message. Some examples of the method, apparatuses, and non-transitory computer-readable medium described herein may further include operations, features, means, or instructions for receiving, from the network entity, a key index associated with the master key, one or more security algorithms for the initial AS message, or a combination thereof and forwarding, from the network entity and to the UE, the key index associated with the master key, the one or more security algorithms for the initial AS message, or a combination thereof. In some examples of the method, apparatuses, and non-transitory computer-readable medium described herein, the master key corresponds to an area associated with the network entity. In some examples of the method, apparatuses, and non-transitory computer-readable medium described herein, the UE-specific key may be forwarded in a secure NAS message.

In some examples of the method, apparatuses, and non-transitory computer-readable medium described herein, the UE is a registered UE with a valid NAS security context, and the indication of the second set of information may be protected based on a UE-specific key for an initial AS message. In some examples of the method, apparatuses, and non-transitory computer-readable medium described herein, the indication of the second set of information may be additionally protected based on an SFN value.

Some examples of the method, apparatuses, and non-transitory computer-readable medium described herein may further include operations, features, means, or instructions for receiving, from a network entity of the network, a master key for the initial AS message, receiving, from the UE, an indication of an SFN value, a pseudo-random number, an algorithm identifier, or a combination thereof, deriving the UE-specific key using the master key and one or more identifiers of the UE, deriving a temporary encryption key for the initial AS message based on the UE-specific key and the SFN value, the pseudo-random number, the algorithm identifier, or a combination thereof, and decrypting the indication of the second information using the temporary encryption key. Some examples of the method, apparatuses, and non-transitory computer-readable medium described herein may further include operations, features, means, or instructions for receiving, from the UE, a key index value associated with the UE-specific key and identifying the master key based on the key index value.

Some examples of the method, apparatuses, and non-transitory computer-readable medium described herein may further include operations, features, means, or instructions for receiving, from a network entity of the network, an updated master key for the initial AS message and forwarding, to the UE, an updated UE-specific key for the initial AS message, where the updated UE-specific key may be based on one or more identifiers of the UE and the updated master key.

In some examples of the method, apparatuses, and non-transitory computer-readable medium described herein, the indication of the second set of information may be received in an RRC connection message.

Some examples of the method, apparatuses, and non-transitory computer-readable medium described herein may further include operations, features, means, or instructions for re-transmitting the first set of information in an RRC re-configuration message. Some examples of the method, apparatuses, and non-transitory computer-readable medium described herein may further include operations, features, means, or instructions for receiving, from the UE, a report indicating an identity of an additional base station, at least a portion of the second set of information, or a combination thereof based on the re-transmitted first set of information and verifying whether the additional base station is authorized by the network based on the report.

Some examples of the method, apparatuses, and non-transitory computer-readable medium described herein may further include operations, features, means, or instructions for transmitting, to the UE, an indication that security protection for the first set of information is enabled. In some examples of the method, apparatuses, and non-transitory computer-readable medium described herein, the indication that security protection for the first set of information is enabled may be transmitted in a NAS security mode command message.

DETAILED DESCRIPTION

Figure 1:
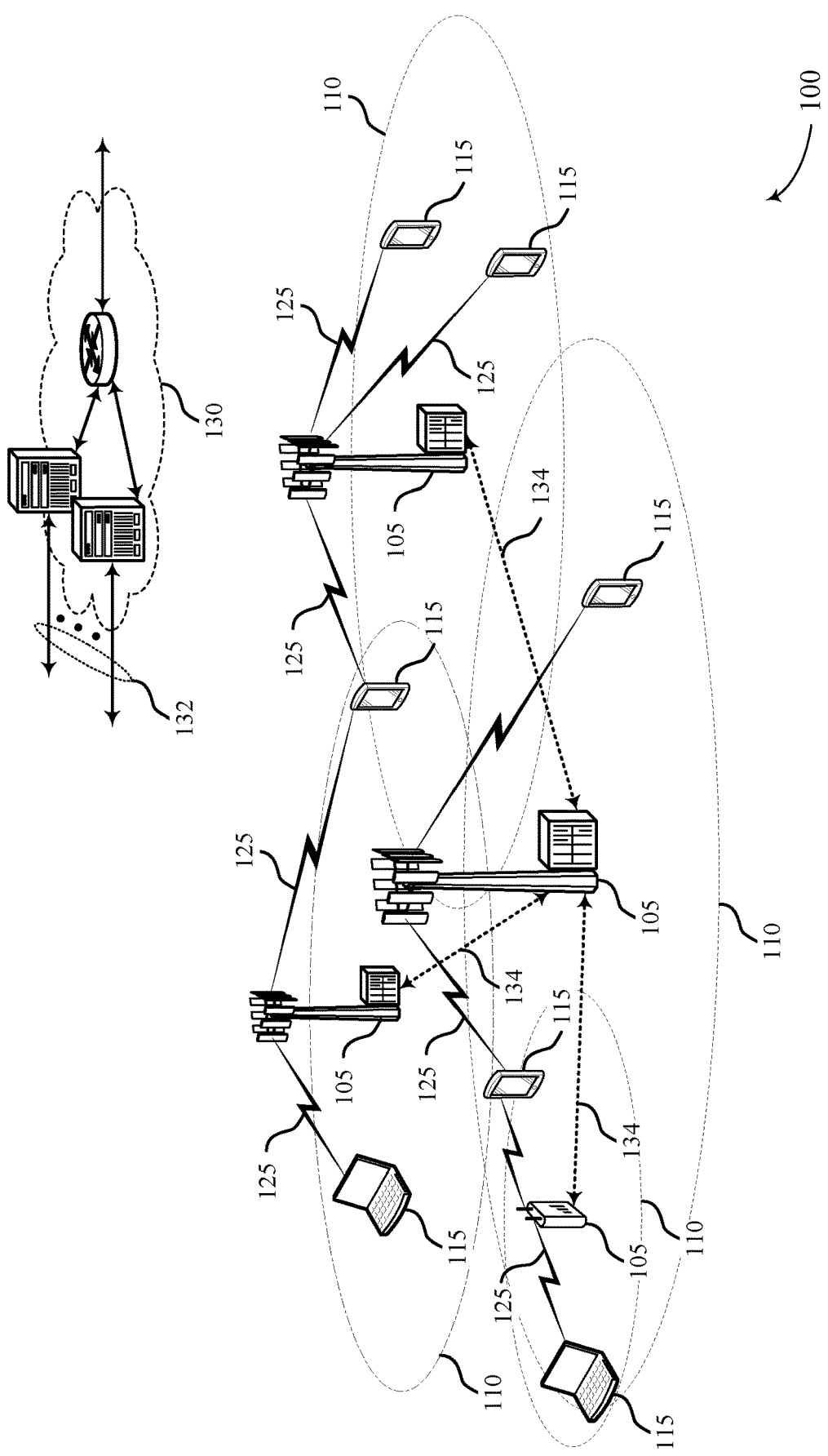
FIGS. 1 and 2 illustrate examples of wireless communications systems that support information protection to detect fake base stations in accordance with aspects of the present disclosure.

In some wireless communications systems (e.g., New Radio (NR) systems), a user equipment (UE) may process a number of messages prior to setting up a secure connection with a base station. These messages may be referred to as "unprotected" messages, as the messages lack protection via ciphering, integrity protection, or both. In some cases, a "fake" base station (e.g., a wireless device acting like a base station of a network) may use these unprotected messages to launch one or more attacks on the UE. For example, if the UE begins a connection procedure with the fake base station, the fake base station may modify one or more of these unprotected messages sent by a real (e.g., verified) base station of the network. The modifications to a message (e.g., a message including system information for the UE) may degrade performance at the UE, deny service to the UE, prevent the UE from receiving important information, cause roaming issues at the UE, or result in any combination of these or other problems for the UE when attempting to connect to the network via the fake base station.

To support authentication of information (e.g., system information) at a UE, the UE may transmit secure indications of unprotected information received prior to establishing a security context with a network. These indications may be used to verify whether the received information was modified by a fake base station prior to reception by the UE. For example, in some wireless communications systems, a real base station (e.g., a base station verified by the network) may broadcast a first set of information in an unprotected message to a set of UEs in a coverage area. An unregistered UE in the coverage area may receive the first set of information in an unprotected message prior to an authentication procedure. This first set of information may include system information, for example, in the form of a master information block (MIB), one or more system information blocks (SIBs), or some combination of these. If a fake base station intercepts and modifies the message before relaying the message to the UE, the UE may receive different information (e.g., a second set of information) than the first set of information transmitted by the verified base station. The UE may then transmit an indication of the received second set of information to the verified base station in a protected message (e.g., relayed through the fake base station). In some cases, based on the indication, the verified base station may re-transmit the first set of information to the UE in a message protected against modification by the fake base station (e.g., using ciphering, integrity protection). If the UE determines that the initially received information is different from the information received in the protected re-transmission, the UE may identify that the message was modified by a fake base station. Based on this detection of the fake base station, the UE may detach from the fake base station and reattach to a different base station in order to communicate with the network.

In some cases, a UE may initiate a connection procedure with a fake base station and the fake base station may accurately relay unprotected messages between the UE and a verified base station. In these cases, the fake base station may avoid detection during the connection procedure, and the UE and the verified base station may establish a security context and, accordingly, a secure connection based on the connection procedure. However, the fake base station may modify unprotected messages after the security context is established. To support information protection and fake base station detection in these cases, the verified base station may transmit one or more requests to the UE (e.g., periodically, aperiodically, based on a security trigger) to provide secure indications of unprotected information even after the security context is established. For example, if a fake base station modifies system information to launch an attack on the UE after the security context is established, the UE may transmit a secure indication of the modified system information based on a request received from the verified base station. Based on this secure indication, the UE and/or the verified base station may detect the attack and identify that the UE is connected to the fake base station.

Additionally or alternatively, once the UE registers with a network (e.g., once the UE has a valid non-access stratum (NAS) security context), the network may provision the UE with a UE-specific key for securing an initial access stratum (AS) message. The UE may use this UE-specific key to security protect an indication of received information in an initial AS transmission to a base station of the network. In some cases, the UE may additionally use the UE-specific key to security protect other information (e.g., privacy sensitive information) included in the initial AS message transmission (e.g., using ciphering and integrity protection). The network may additionally provision verified base stations with information (e.g., a master key, a key index, an initial AS security protection algorithm) that supports decryption of the indication. A base station verified by the network may determine whether to re-transmit information to the UE in a protected message based on the received indication. The UE may determine inauthentic information and detect a fake base station if the protected information received in the re-transmission is different from the information (e.g., the inauthentic information) initially received at the UE.

In a first example, the secure indication of unprotected information received at a UE may be an example of a hash value. For example, the UE may receive system information from a base station and may calculate a hash value using the system information as input to a hashing function. In some cases, the hash value may further be based on a system frame number (SFN) value associated with the system information. The UE may transmit the calculated hash value and an identifier of the system information (e.g., an SIB number of the system information used for the hash) to the base station in a protected message. In this first example, the base station may determine whether the received information was modified based on the hash value, and the base station may re-transmit the information in a secure message if the unprotected information was modified. In a second example, the secure indication of unprotected information received at a UE may be an example of a request for retransmission of information. For example, the UE may receive unprotected information for a particular MIB or SIB and may transmit a request for the MIB or SIB to the base station in a protected message. The base station may re-transmit the information corresponding to the indicated MIB or SIB number in a protected message based on the request. In this second example, the UE may determine whether the received unprotected information was modified by comparing it to the protected information received in the re-transmission.

Aspects of the disclosure are initially described in the context of wireless communications systems. Additional aspects of the disclosure are described with reference to process flows. Aspects of the disclosure are further illustrated by and described with reference to apparatus diagrams, system diagrams, and flowcharts that relate to information protection to detect fake base stations.

FIG. 1 illustrates an example of a wireless communications system 100 that supports information protection to detect fake base stations in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples, the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some wireless communications systems 100, a network may include a number of base stations 105 that are verified by the network. These base stations 105 may be referred to as verified base stations, "real" base stations, authorized base stations, legitimate base stations, or the like. However, other wireless devices may operate within the wireless communications system 100 that are not part of the network. In some cases, these wireless devices may perform operations to appear as if they are part of the network. For example, a device may act as a UE 115 with respect to a real base station 105 in order to obtain a valid subscription to the network through the real base station 105 and may act as a base station 105 with respect to a UE 115 to launch attacks on the UE 115. Such a device may be referred to as a "fake" or "rogue" base station 105, as the device may communicate with one or more UEs 115 as if the device is a real base station 105 of the network. However, the device may modify unprotected messages intended for the UEs 115 to negatively impact performance, throughput, cost, etc., of communications between the UEs 115 and the network.

Wireless communications system 100 may support base stations 105 and UEs 115 protecting information against such attacks by fake base stations. A base station 105 verified by the network may transmit a first set of information to a UE 115 in an unprotected message. If a fake base station intercepts and modifies the message before relaying the message to the UE 115, the UE 115 may receive different information (e.g., a second set of information) than the transmitted first set of information. The UE 115 may then transmit an indication (e.g., a hash value, a request) of the received second set of information to the verified base station 105 in a protected message. In some cases, based on the indication, the verified base station 105 may re-transmit the first set of information to the UE 115 in a message protected against modification by the fake base station (e.g., using ciphering, integrity protection). If the UE 115 determines that the initially received information is different from the information received in the protected re-transmission, the UE 115 may identify that the message was modified by a fake base station. Based on this detection of the fake base station, the UE 115 may detach from the fake base station and reattach to a different base station 105 in order to communicate with the network.

Additionally or alternatively, once the UE 115 registers with the network, the network may provision the UE 115 with a UE-specific key for securing initial connection messaging. The UE 115 may use this UE-specific key to security protect an indication of received information during a connection procedure with a base station (e.g., in a random access channel (RACH) request, an RRC connection request, or an RRC connection setup complete message). The network may additionally provision verified base stations 105 with information (e.g., a master key, a key index, an encryption algorithm) that supports decryption of the indication. If the UE 115 is performing the connection procedure with a fake base station, the fake base station may not be able to identify the indication, as the fake base station is not provisioned with the decryption information. A real base station 105 may receive the indication, decrypt the protected message, and determine whether to re-transmit information to the UE 115 in a protected message based on the received indication. The UE 115 may determine inauthentic information and detect a fake base station if the protected information received in the re-transmission is different from the information initially received at the UE 115.

Figure 2:
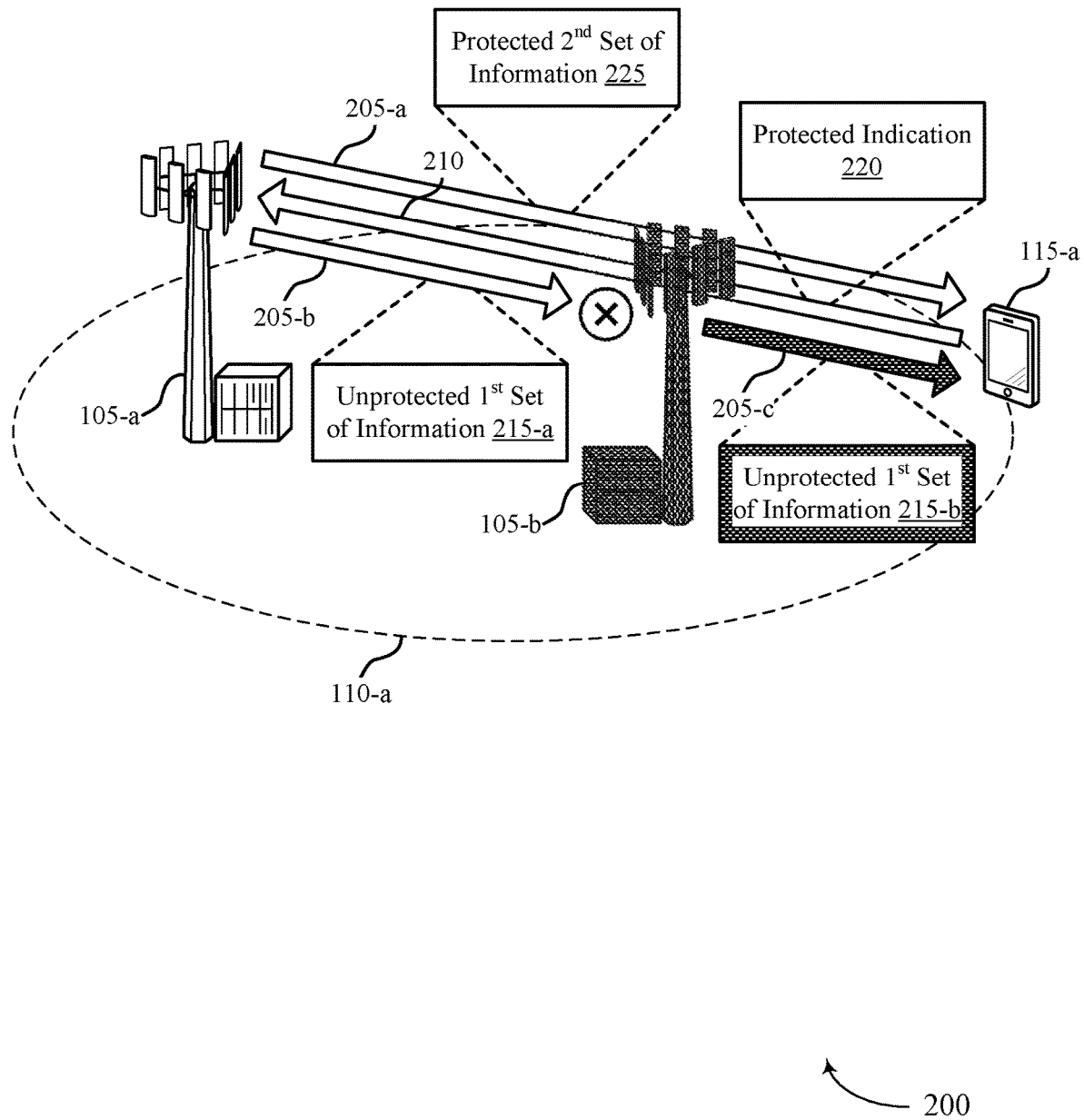

FIG. 2 illustrates an example of a wireless communications system 200 that supports information protection to detect fake base stations in accordance with aspects of the present disclosure. Wireless communications system 200 may implement aspects of wireless communication system 100. For example, a wireless communications system 200 may include UE 115-a and base station 105-a, which may be examples of the devices described with reference to FIG. 1. Base station 105-a may serve a cell with a coverage area 110-a. Wireless communications system 200 may also include a wireless device that operates as a fake base station 105-b. To protect information against attacks from the fake base station 105-b, the wireless communications system 200 may implement techniques for authenticating information in unprotected transmissions, supporting detection of fake base stations 105.

In some wireless communications systems, such as wireless communications system 200, a malicious third party user may attempt to breach the security of the system via a fake base station 105-b. For example, a fake base station 105-b may attempt to bypass system information protections. In cases where a security context is established between a UE 115 (e.g., UE 115-a) and a real base station 105 (e.g., base station 105-a), one or both of the wireless devices may protect signaling at one or more layers. For example, a device may use encryption, integrity protection, or both to protect information transmitted in the system. However, prior to establishing a security context, certain types of transmissions may be vulnerable to security breaches. To protect against a fake base station 105-b making unauthorized modifications to signaling (e.g., system information transmissions in MIBs, SIBs, or both), the wireless communications system 200 may support security enhancements. These security enhancements may prevent certain attacks or scams (e.g., denial of service (DOS) attacks, availability attacks) by fake base stations 105. Even in cases where a malicious third party user modifies or replicates system information using a fake base station 105-b, the security enhancements may prevent the malicious third party from establishing a secure connection between the fake base station 105-b and a UE 115-a (e.g., due to an initial access procedure or an AS security mode command failing).

Base station 105-a may be an example of a real base station 105 verified by the network. Base station 105-a may communicate with UE 115-a on a downlink channel 205, an uplink channel 210, or both. In some cases, transmissions sent from base station 105-a may be received at UE 115-a without unauthorized modification. For example, base station 105-a may transmit directly to UE 115-a on a downlink channel 205-a, or a base station 105-b may relay information from base station 105-a to UE 115-a without modification in downlink channel 205-a. Similarly, transmissions sent from UE 115-a to base station 105-a over uplink channel 210 may be received without unauthorized modifications (e.g., via direct transmission or successful relaying). However, in other cases, a fake base station 105-b may act as a relay device between verified base station 105-a and UE 115-a. Fake base station 105-b may receive information from base station 105-a over downlink channel 205-b and may modify the information in a process transparent to both base station 105-a and UE 115-a. Fake base station 105-b may then transmit the modified information to UE 115-a over downlink channel 205-c, such that UE 115-a receives the modified information as if it is the originally transmitted information from base station 105-a.

In some cases, UE 115-a may connect to a fake base station 105-b through a connection procedure. For example, the fake base station 105-b may block a first downlink transmission (e.g., on downlink channel 205-b) and may send a modified downlink transmission in its place (e.g., on downlink channel 205-c). Based on this modified downlink transmission, UE 115-a may connect to the fake base station 105-b, potentially exposing the UE 115-a to attacks. If UE 115-a connects to the fake base station 105-b, the fake base station 105-b may launch different types of attacks against the UE 115-b using an unprotected first set of information 215-b. For example, this unprotected first set of information 215-b may correspond to any number of broadcast or unicast messages processed at the UE 115-a before a security setup procedure is complete. As these messages are unprotected (e.g., they lack protection via ciphering, integrity protection, or both), they may be vulnerable to attack by the fake base station 105-b.

In other cases, the fake base station 105-b may perform a man-in-the-middle attack. In these cases, the fake base station 105-b may act as a relay between a verified base station 105-a and the UE 115-a. In this manner, the fake base station 105-b may be able to launch different types of attacks on the UE 115-a using messages that the UE 115-a identifies as originating from a verified base station 105-a. The fake base station 105-b may act as a UE 115 to base station 105-a to obtain a valid subscription to the network and may act as a base station 105 to UE 115-a to connect to the UE 115-a. The fake base station 105-b may properly or improperly relay messages between base station 105-a and UE 115-a. For example, the fake base station 105-b may properly relay some information to allow UE 115-a to configure security with base station 105-a, but the fake base station 105-b may make unauthorized modifications to any number of unprotected signals transmitted between the devices (e.g., even after security is configured). These unprotected messages may correspond to messages in layers below the packet data convergence protocol (PDCP) layer, such as the radio link control (RLC) layer, the medium access control (MAC) layer, or the physical (PHY) layer.

Potential attacks performed by a fake base station 105-b connected to a UE 115-a may involve the fake base station 105-b transmitting fake or modified system information (e.g., in an inauthentic MIB or set of SIBs) or transmitting other fake or modified unprotected messages to the UE 115-a in the unprotected first set of information 215-b. A modified MIB or SIB may support various types of DoS attacks (e.g., using a wrong public land mobile network identifier (PLMN-ID), cell barring for a group of UEs 115 using the first SIB (SIB1) or for a specific UE 115 using the second SIB (SIB2)), amplification and/or DOS attacks (e.g., using a fake tracking area code (TAC) to trigger continuous tracking area updates (TAUs)), relay attacks (e.g., location record poisoning via a fake TAC, behavior profiling of a UE 115-a, including call information, short message service (SMS) information, data traffic information, blocking downlink messages from the core network to deny service), or any combination of these or other possible attacks. In some cases, a malicious third party user may inject fake messages into a communication stream without intercepting connection. In some examples, these types of attacks may be more damaging than fake base station attacks.

A fake base station 105-a connected to UE 115-a may modify various parameters in an MIB to degrade the performance of UE 115-a. For example, the fake base station 105-a may modify an SFN, a downlink bandwidth, scheduling information, or some combination of these or other parameters in the MIB. Additionally or alternatively, the fake base station 105-a may modify various parameters in an SIB. These parameters (e.g., for SIB1) may include, but are not limited to, a PLMN identity list, a TAC, a cell identity, cell barring, a closed subscriber group (CSG) indication, cell selection information, a frequency band indicator, a scheduling information list, a time division duplexing (TDD) configuration, and a system information value tag. Modifying one or more of the above indicated fields may cause the UE 115-a to fail to select a suitable cell, delay access to a suitable cell, consume excessive battery life, fail to correctly decode system information, perform incorrect operations, and/or perform inefficiently.

For example, an SIB1 (e.g., in an LTE system, an NR system, or any other wireless communications system) may contain access related parameters such as barring information, CSG identity, etc. Different types of systems may refer to similar parameters using different names. If the fake base station 105-b modifies any of these parameters for UE 115-a, the fake base station 105-b may delay or prevent the UE 115-a from accessing the cell (e.g., the cell associated with verified base station 105-a). In one specific example, by setting the barring bit in an inauthentic SIB1, the fake base station 105-b may prevent UE 115-a from accessing the cell for a significant period of time (e.g., up to five minutes). Further, modifying the access control parameters may impact connection setup, as improper settings can delay connection setup, degrading service for the UE 115-a. Modifying cell selection parameters, which may be broadcast in other SIBs for neighboring UEs 115, may delay or prevent camping by UE 115-a. For example, if the fake base station 105-b broadcasts a high minimum level for signal quality, multiple UEs 115 may be prevented from camping at a verified base station 105-a.

Some systems implement solutions from an AS security perspective to allow UEs 115 operating in an RRC idle mode to detect fake base stations 105 and, accordingly, prevent one or more of the potential fake base station attacks. In a first example, a system may implement digital signatures for system information verification. While the digital signatures may mitigate system information attacks (e.g., replay attacks, DoS attacks), the size of the protected system information transmission may be much larger than the size of an unprotected system information transmission due to the digital signature and timestamp parameters. Accordingly, systems implementing digital signatures for system information protection may incur a large increase in processing and/or memory overhead. This may result in inefficient communications within the system. In a second example, a system may support UEs 115 verifying fake base stations 105 using "system queries." However, for a "system query" solution to protect system information, a UE 115 may need to communicate with the network despite being in an RRC idle mode. If the UE 115 camps on a false cell during an RRC idle state, the UE 115 may be susceptible to possible DoS or availability attacks. For example, if the UE 115 camps on a fake base station 105, the fake base station 105 may send fake messages to—or stop real messages from reaching—the UE 115, such as public safety warnings, incoming emergency calls, real-time application server push services, proximity services, etc. Some services, like the Earthquake & Tsunami Warning System (ETWS), may be offered to the UE 115 in the RRC idle mode through one or more Ms. As such, to ensure that the UE 115 receives these services, the UE 115 may not be allowed to camp at a fake base station 105 in RRC idle mode.

From an RRC control plane signaling (e.g., unicast messages) perspective, there may be unprotected procedures performed before AS security activation, including an RRC connection setup procedure, UE identity acquisition procedure, UE capability information transfer, downlink/uplink information transfer procedure, etc. A fake base station 105 may execute attacks on these signals as well, as malicious attacks in a wireless communications system 100 or 200 may be on any unprotected initial messages between UEs and base stations 105. For example, a fake base station 105 may make unauthorized modifications to signals like attach reject messages (e.g., using enclosure management module (EMM) error codes), tracking area update reject messages, etc., which may be transmitted by a network-verified base station 105-e over the air interface prior to AS security activation.

Many possible implementations for AS security during an RRC idle mode result in significant overhead, excessive signaling, unprotected messaging, or some combination of these issues. In one implementation, a network may sign selected signaling messages with a certificate-based signature, an elliptic curve digital signature algorithm (ECDSA), etc. As discussed above, these signature-based solutions may result in significant and detrimental overhead in the system. In another implementation, a UE 115 may verify the authenticity of a base station 105 during an RRC idle mode. In this implementation, a UE 115 may use a certificate-based signature, an identity-based signature (IBS), or both to verify a base station 105. In some cases, verification may additionally be based on one or more "freshness" parameters (e.g., global positioning system (GPS) values, a coordinated universal time (UTC) time). Again, such a scheme may result in significant and detrimental overhead to the system. In yet another implementation, a UE 115 may detect a fake base station 105 using uplink traffic monitoring and system queries. In this implementation, the UE 115 may need to monitor the uplink traffic of nearby UEs within the system. UEs 115 may not support this excessive level of signal monitoring. In yet another implementation, a UE 115 may detect a fake base station 105 using an IBS to protect a redirection message to a 2nd Generation (2G) system. Such an implementation may use a key exchange and mutual verification based on identity-based cryptography (IBC), which may require an exchange of messages between the UE 115 and base station 105. Such an exchange of messages may be susceptible to attacks from a fake base station 105, resulting in security risks within the system. Each of these implementations may be non-ideal solutions for protecting information, such as system information.

In contrast, the wireless communications system 200 may protect initial AS messages, which may result in protection for system information (e.g., MIBs, SIBs) or other unprotected, lower-layer messages. The wireless communications system 200 may implement a shared key-based approach, which may be more efficient (e.g., resulting in a significantly lower overhead) than implementing signatures for system information protection. The wireless communications system 200 may support protection at UE 115-a against fake base stations 105 modifying unprotected information. For unregistered UEs 115, unauthorized modification detection may occur during an AS security mode command procedure. Registered UEs 115 may improve the detection latency by performing the unauthorized modification detection during a connection procedure (e.g., a RACH procedure or RRC configuration procedure). A verified base station 105-a may determine whether unprotected information was modified (e.g., by a fake base station 105-b) and may re-transmit the correct information in a secure message (e.g., an RRC re-configuration message). Additionally, all unprotected messages transmitted prior to AS security setup may be protected using initial AS protection keys for registered UEs 115.

In some cases, this approach may protect against false negative results when performing fake base station 105 detection. For example, even if UE 115-a connects to fake base station 105-b, UE 115-a may identify if unprotected messages are modified by fake base station 105-b. This may provide a second level of defense for information protection. This cryptographic protection may be implemented alone or in combination with other protection mechanisms (e.g., public or shared key approaches).

In a specific example, verified base station 105-a may transmit an unprotected first set of information 215-a to UE 115-a over downlink channel 205-b. This unprotected first set of information 215-a may be, for example, an SIB and may lack protection via ciphering, integrity protection, or both. Fake base station 105-b may receive the unprotected first set of information 215-a, but, rather than relaying this information to UE 115-a, the fake base station 105-b may modify the information to obtain unprotected first set of information 215-b. The modified unprotected first set of information 215-b may include one or more modified parameters that degrade performance at UE 115-a. Fake base station 105-b may transmit the modified unprotected first set of information 215-b to UE 115-a over downlink channel 205-c. UE 115-a may receive the modified unprotected first set of information 215-b as if it was relayed correctly through an actual base station 105.

To protect against such an unauthorized modification, UE 115-a may transmit a protected indication to base station 105-a on uplink channel 210. The indication may be protected via ciphering, integrity protection, or both, such that fake base station 105-b may not modify or decode the indication. The indication may indicate the unprotected first set of information 215-b received by UE 115-a. For example, the indication may include an indication of the information received (e.g., in a hash value) or a request for the base station 105-a to re-transmit the information. Base station 105-a may receive the protected indication 220 and may determine the indication (e.g., as base station 105-a is verified by the network, base station 105-a may be provisioned information by the network needed to decode the protected indication). As the originally transmitted unprotected first set of information 215-a was modified by fake base station 105-b, base station 105-a may re-transmit the first set of information. For example, base station 105-a may re-transmit the SIB as a protected second set of information 225 over downlink channel 205-a, where the second set of information is protected via ciphering, integrity protection, or both. Again, because this information is protected, fake base station 105-b may not be capable of reading or modifying the information. UE 115-a may receive the protected second set of information 225 and may compare it to the unprotected first set of information 215-b. If the second set of information is different from the first set, UE 115-a may detect that the unprotected first set of information 215-b was modified (e.g., UE 115-a detects SIB modification) and is inauthentic. Based on this detection, UE 115-a may determine that the wireless device acting as a relay base station 105 is a fake base station 105-b, and UE 115-a may detach from the fake base station 105-b. In this way, UE 115-a may efficiently receive the correct, unmodified system information (e.g., in the protected second set of information 225) despite connecting to a fake base station 105-b, while also detecting and detaching from the fake base station 105-b.

Figure 3:
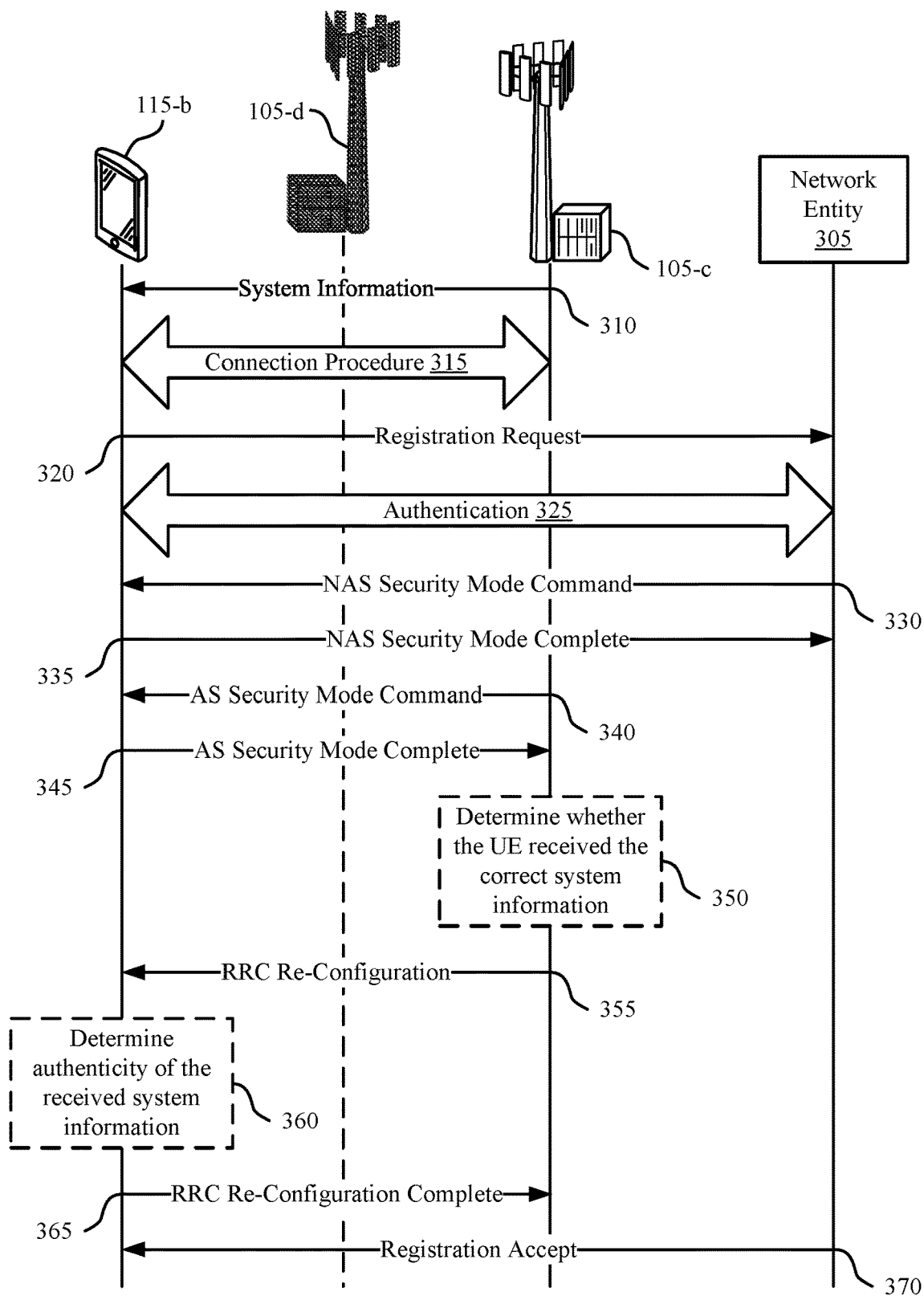
FIGS. 3 and 4 illustrate examples of process flows that support information protection to detect fake base stations in accordance with aspects of the present disclosure.

FIG. 3 illustrates an example of a process flow 300 that supports information protection to detect fake base stations in accordance with aspects of the present disclosure. The process flow 300 may illustrate an initial network access procedure for an unregistered UE 115 (e.g., a UE 115 without a valid NAS security context). In some examples, the process flow 300 may implement aspects of wireless communications systems 100 and 200. The process flow 300 may include base station 105-c and UE 115-b, which may be examples of the devices described with reference to FIGS. 1 and 2. Base station 105-c may be an example of a real or verified base station of a network. The base station 105-c may communicate with the network via a network entity 305, such as an access and mobility management function (AMF), a security anchor function (SEAF), or some combination of these or other network entities. In some cases, a device may operate as a relay between base station 105-c and UE 115-b. This device may function as a fake base station 105-d. Alternative examples of the following may be implemented, where some steps are performed in a different order than described or are not performed at all. In some cases, steps may include additional features not mentioned below, or further steps may be added.

At 310, UE 115-b may receive a first set of information from base station 105-c. This first set of information may be associated with communicating with a network. For example, the first set of information may include system information in an MIB, a set of SIBs, or a combination thereof. As the UE 115-b has not yet connected to the network or performed an authentication procedure, the UE 115-b may not have a valid security context established with the network. Accordingly, base station 105-c may transmit the first set of information in an unprotected message (e.g., the first set of information lacks protection via ciphering, integrity protection, or both) so that UE 115-b may successfully receive and decode the first set of information. However, transmitting the first set of information in the unprotected message leaves the information vulnerable for attack by a fake base station 105-d. In some cases, if a fake base station 105-d relays the first set of information from the base station 105-c to the UE 115-b, the fake base station 105-d may modify the information in one or more ways. As such, UE 115-b may receive inauthentic information (e.g., inauthentic system information) from base station 105-c due to the man-in-the-middle attack by base station 105-d. This attack may result in performance loss or other inefficiencies at UE 115-b.

At 315, UE 115-b may perform a connection procedure 315 to connect to the network. The connection procedure may include a random access procedure and an RRC configuration procedure. In some cases, UE 115-b may perform the connection procedure to attach to the network via base station 105-c. However, in other cases (e.g., if the fake base station 105-c relays information between base station 105-c and UE 115-b), UE 115-b may perform the connection procedure to attach to the network via fake base station 105-d (e.g., and base station 105-c). The connection procedure 315 may involve UE 115-b transmitting a RACH request message (Msg1) and receiving a RACH response (RAR) message (Msg2) from base station 105-c. Additionally, the connection procedure 315 may involve UE 115-b transmitting an RRC connection request message (Msg3) to base station 105-c, receiving an RRC connection setup message (Msg4) from base station 105-c, and transmitting an RRC connection setup complete message (Msg5) to base station 105-c upon configuring the RRC. In some cases, one or more of these messages may be referred to as initial AS messages. For example, UE 115-b may transmit the RRC connection setup complete message as an initial AS message.

At 320, UE 115-b may transmit a registration request to the network. Registering the UE 115-b with the network may allow the UE 115-b to obtain a valid NAS security context with the network. The registration request may be sent to the network via fake base station 105-d, base station 105-c, network entity 305, or any combination of these devices. At 325, the network may perform an authentication procedure to authenticate UE 115-b. In some cases, the UE 115-b may additionally authenticate the base stations 105, the network, or both.

At 330, the network may send a NAS security mode command (e.g., by a network entity 305) to UE 115-b. For example, base station 105-c may receive the NAS security mode command from the network entity 305 and may forward the NAS security mode command to UE 115-b. The network may include network policy information in the NAS security mode command. For example, the UE 115-b may receive, at 330, an indication that a security feature (e.g., security protection for the first set of information) is enabled. This indication may be an indication of SIB and/or MIB protection at the radio access network (RAN). In one example, the NAS security mode command may include an information element (e.g., one or more bits) to indicate whether the security feature is enabled. For example, a first bit value (e.g., a one (1) value) for this information element may indicate that SIB and/or MIB protection is enabled for the network, while a second bit value (e.g., a zero (0) value)

may indicate that SIB and/or MIB protection is not enabled or disabled for the network. The UE 115-*b* may receive the NAS security mode command message, identify the value of this indication, and determine whether to perform information protection to detect fake base stations, as described herein, based on the identified value. UE 115-*b* may configure NAS securities based on the NAS security mode command and may transmit, at 335, a NAS security mode complete message in response.

At 340, base station 105-*c* may transmit an AS security mode command to UE 115-*b*. UE 115-*b* may configure AS securities based on the AS security mode command and may transmit, at 345, an AS security mode complete message in response. In some cases (e.g., if security protection for the first set of information is enabled), UE 115-*b* may include an indication of the first set of information in the AS security mode complete message. That is, at 345, UE 115-*b* may transmit, to base station 105-*c*, an indication of the first set of information. As the AS security mode complete message is a protected message (e.g., the information contained in the AS security mode complete message is ciphered, integrity protected, or both), the indication is protected via ciphering, integrity protection, or both.

In a first example, the indication may be an example of a hash value. This hash value may be based on the first set of information received at UE 115-*b*. In some cases, the hash value may additionally be based on an SFN value associated with the first set of information. For example, UE 115-*b* may calculate a hash value for an SIB using at least a portion of the SIB and the corresponding SFN value as inputs to a hashing function. The hashing function may be pre-configured at UE 115-*b*, configured by the network or base station 105-*c* in a protected message, or dynamically determined by UE 115-*b*. Additionally or alternatively, UE 115-*b* may determine a hash value for multiple SIBs, an MIB, or some combination thereof. UE 115-*b* may also include, in the AS security mode complete message, an indication of the MIB and/or SIB(s) (e.g., SIB number) read by UE 115-*b* at 310 and used to generate the hash. Additionally or alternatively, the indication may include other unprotected information exchanged between the UE 115-*b* and the real base station 105-*c* prior to completing the security setup procedure. Such unprotected information may also be used to generate the hash.

Base station 105-*c* may receive, from UE 115-*b*, the indication of the information received at the UE 115-*b*. At 350, base station 105-*c* may determine whether to re-transmit, to the UE 115-*b*, the first set of information in a protected message (e.g., where the first set of information is protected via ciphering, integrity protection, or a combination thereof) based on the indication of the second set of information. For example, base station 105-*c* may determine whether UE 115-*b* received the correct system information by comparing the information indicated by the hash value at 345 to the information transmitted at 310. If base station 105-*c* detects any prior modification of the first set of information (e.g., if the MIB and/or SIB(s) indicated by the hash value at 345 are different from the MIB and/or SIB(s) transmitted at 310), base station 105-*c* may determine to re-transmit the modified information. Additionally or alternatively, if base station 105-*c* identifies a change to the system information for the network since UE 115-*b* received the system information at 310, the base station 105-*c* may determine to re-transmit the changed information. In these cases, base station 105-*c* may re-transmit the first set of information (e.g., a portion or a complete MIB, set of SIBs, or some combination thereof) to UE 115-*b* at 355. For example, base station 105-*c* may re-transmit the first set of information in an RRC re-configuration message, where the first set of information is protected via ciphering, integrity protection, or a combination thereof.

In a second example, the indication may be an example of a request for information. For example, if UE 115-*b* received a particular MIB or SIB at 310, UE 115-*b* may send a request for the MIB or SIB at 345. UE 115-*b* may indicate an MIB, a set of SIBs (e.g., using SIB numbers), or both in a protected request for re-transmission. Base station 105-*c* may receive the request and may determine to re-transmit the indicated information to UE 115-*b* in a protected message. For example, if UE 115-*b* requests re-transmission of the first set of information, base station 105-*c* may re-transmit the first set of information in an RRC re-configuration message at 355, where the first set of information is protected via ciphering, integrity protection, or a combination thereof. Additionally or alternatively, base station 105-*c* may re-transmit any system information that changed for the network since UE 115-*b* received the system information at 310.

In some examples, UE 115-*b* may transmit some combination of one or more hash values and one or more requests for re-transmissions in an uplink message. Base station 105-*c* may transmit the RRC re-configuration message with or without the re-transmission of the first set of information depending on the indication received from UE 115-*b*.

At 360, UE 115-*b* may determine the authenticity of the first set of information received at 310. For example, UE 115-*b* may decode the protected information re-transmitted by base station 105-*c* at 355 and may determine if the re-transmitted information is different from the information initially received at 310. If the received sets of information are the same, UE 115-*b* may determine that the first set of information received at 310 is authentic and may communicate with the network using the established connection. In this case, the UE 115-*b* may not be receiving modified messages from a fake base station 105-*d*. The UE 115-*b* may re-configure an RRC connection based on the RRC re-configuration message and may transmit an RRC re-configuration complete message to base station 105-*c* at 365.

If the received sets of information are different, UE 115-*b* may determine that the unprotected message received at 310 was modified and is inauthentic. In these cases, UE 115-*b* may determine the presence of fake base station 105-*d* based on detecting the unauthorized message modification. If UE 115-*b* detects that it is connected to a fake base station 105-*d*, UE 115-*b* may detach from the fake base station 105-*d*. UE 115-*b* may reattach to a different base station 105 to communicate with the network. In some cases, UE 115-*b* may connect directly to base station 105-*c*. In other cases, UE 115-*b* may connect to another base station 105 (not shown) that may act as a relay for between base station 105-*c* and UE 115-*b*. In any of these cases, UE 115-*b* may repeat the above process to determine if the new connection is to a real base station 105 or a fake base station 105. Once UE 115-*b* connects to a real base station verified by the network, where the UE 115-*b* determines the connection based on receiving authentic system information in an unprotected message, UE 115-*b* may communicate with the network via the connection.

If UE 115-*b* detects one or more fake base stations 105, UE 115-*b* may report the fake base stations 105 upon successfully connecting to the network via a verified base station 105. For example, a registered UE 115-*b* (e.g., a UE 115 having a valid NAS security context) may report, to a verified base station 105-*c*, an identity of a detected or suspected fake base station 105-d, at least a portion of the inauthentic information (e.g., MIB or SIB contents modified by the fake base station 105-d) for the detected or suspected fake base station 105-d, or a combination of these. Base station 105-c may receive the report and perform a verification process with an identified fake base station 105-d. This verification process may allow the network to attempt to verify the legitimacy of a detected or suspected fake base station 105-d. The verification process may involve base station 105-c performing transport network layer (TNL) discovery to attempt to receive an address for fake base station 105-d, setting up an Xn connection with fake base station 105-d, reporting the fake base station 105-d to a network entity 305, or performing some combination of these or related processes. If base station 105-c or the network verifies that base station 105-d is a fake base station, base station 105-c may generate and transmit a message identifying the fake base station 105-d as a security threat. In some cases, this fake base station 105-d identification may be included in an MIB or SIB transmission. UEs 115 receiving the message may refrain from connecting to the fake base station 105-d based on this message.

In some cases, once a UE 115 has completed initial network access and is registered with the network, the network may provision the UE 115 with a UE-specific key. The UE-specific key may improve protection for initial AS messages by the registered UE 115-b, reducing the latency involved in detecting fake base stations 105 during a connection procedure. For example, at 370, the network (by a network entity 305) may forward the UE-specific key to UE 115-b via base station 105-c. This UE-specific key may be transmitted in a registration accept message at 370, which may be in response to the registration request message received by the network at 320. A registered UE 115-b may use the UE-specific key to protect an indication of information transmitted in an initial AS message (e.g., a RACH request, an RRC connection request, an RRC connection setup complete message) in a subsequent connection procedure.

To create the UE-specific key, the network entity 305 may use a master key. The network entity 305 (e.g., an AMF) may generate and/or store a master initial AS key, $K_{INIT\_AS}$. The network entity 305 may provision this master key, a key index corresponding to a specific version (e.g., a current version) of the master key, one or more algorithms (e.g., encryption algorithms, such as initial AS security protection algorithms), or some combination of these variables to verified base stations 105 of the network. For example, the network entity 305 may provision some or all of this information to base stations 105 in an area (e.g., a tracking area, a registration area) associated with the network entity 305.

The network entity 305 may derive the UE-specific key using the master key and the identity of the UE 115-b. For example, the network entity 305 may perform a key derivation function, where the key derivation function accepts the master key and one or more identifiers of the UE 115-b as inputs and outputs a UE-specific initial AS security key, $K_{INIT\_AS\_UE}$. The UE identifiers may include a globally unique temporary identity (GUTI), a serving temporary mobile subscriber identity (S-TMSI), a temporary mobile subscriber identity (TMSI), or any combination of these or other identifiers for the UE 115-b. The UE-specific initial AS key may be associated with a specific key index (e.g., based on the key index of the master key used to derive the UE-specific key). The network entity 305 may provision UE 115-b with the UE-specific key at 370. Additionally, the network entity 305 may provision UE 115-b with the key index associated with the UE-specific key, one or more security algorithms for initial AS protection, or a combination thereof. This provisioning may be performed via the verified base station 105-c in a secure NAS message, such as a registration accept message.

Figure 4:
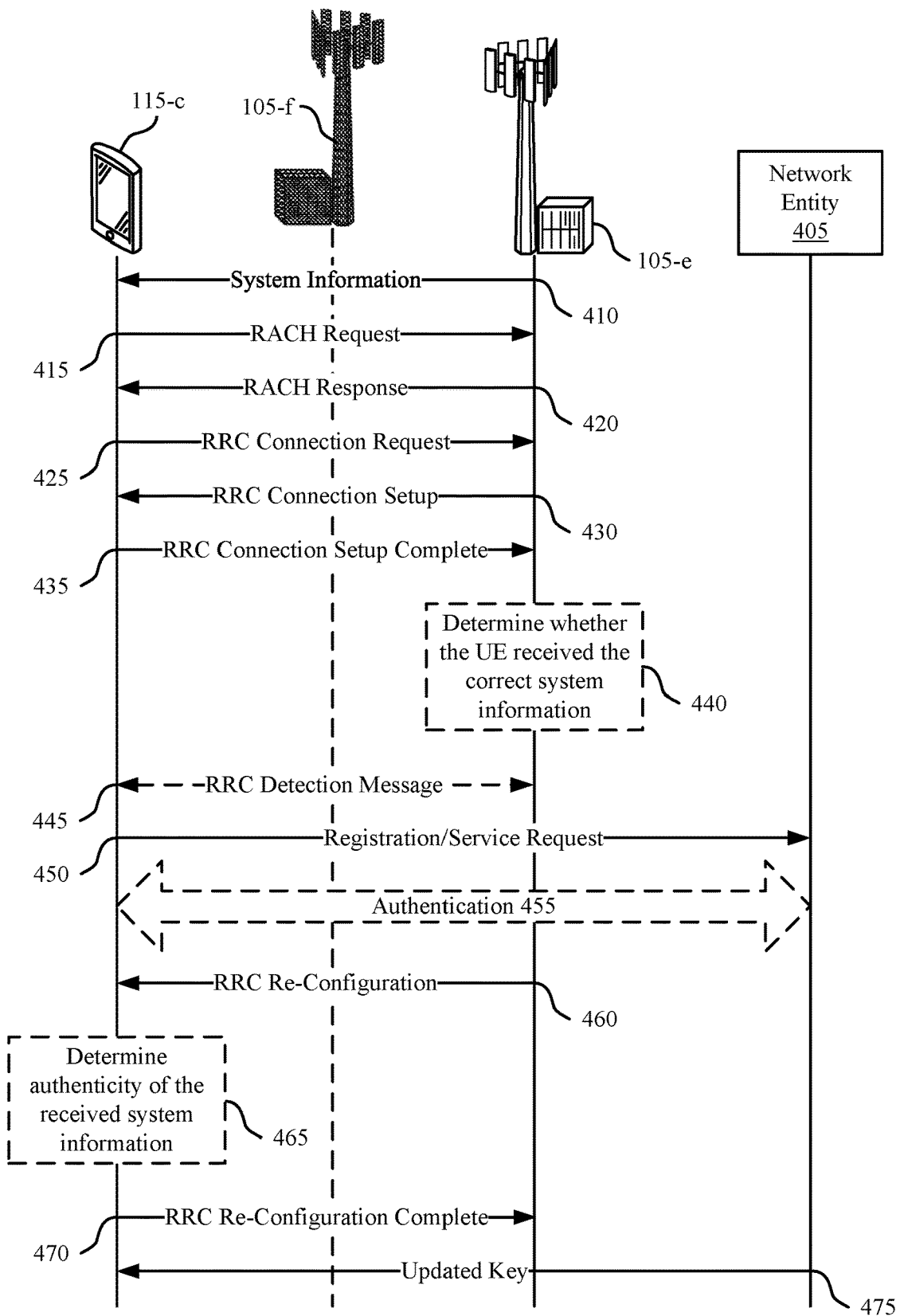

FIG. 4 illustrates an example of a process flow 400 that supports information protection to detect fake base stations in accordance with aspects of the present disclosure. The process flow 400 may illustrate a network access procedure for a registered UE 115 (e.g., a UE 115 with a previously established, valid NAS security context). In some examples, the process flow 400 may implement aspects of wireless communications systems 100 and 200. The process flow 400 may include base station 105-e and UE 115-c, which may be examples of the devices described with reference to FIGS. 1 and 2. Base station 105-e may be an example of a real or verified base station of a network. The base station 105-e may communicate with the network via a network entity 405, such as an AMF, an SEAF, or some combination of these or other network entities. In some cases, a device may operate as a relay between base station 105-e and UE 115-c. This device may function as a fake base station 105-f. Alternative examples of the following may be implemented, where some steps are performed in a different order than described or are not performed at all. In some cases, steps may include additional features not mentioned below, or further steps may be added.

UE 115-c may be an example of a registered UE 115. For example, UE 115-c may have previously performed an initial access procedure to register with the network, as described herein with reference to FIG. 3. During this initial access procedure, the network may provision UE 115-c with a UE-specific key for protecting initial AS messages. If registered UE 115-c performs a connection procedure with a valid NAS security context and UE-specific key, the network may support UE 115-c authenticating a first set of information (e.g., system information) and detecting a connection to a fake base station 105-f. This connection procedure by UE 115-c may be an example of a handover procedure, a re-connection procedure based on UE 115-c entering an RRC connected mode from an RRC idle mode, or any other connection procedure where UE 115-c attempts to connect to the network via a different base station 105.

At 410, UE 115-c may receive, from base station 105-e, a first set of information associated with communicating with the network. For example, the first set of information may include system information in an MIB, a set of SIBs, or a combination thereof. Base station 105-c may transmit the first set of information in an unprotected message (e.g., the first set of information lacks protection via ciphering, integrity protection, or both), and UE 115-c may successfully receive and decode the first set of information. However, because the first set of information is not protected by ciphering, integrity protection, or both, a fake base station 105-f may receive (e.g., intercept) the first set of information, decode the information, and modify the information. Modifying the information, such as system information, may allow the fake base station 105-f to reduce the efficiency or performance of communications between the UE 115-c and the network. As such, UE 115-c may receive inauthentic information (e.g., system information modified by a fake base station 105-f) from base station 105-e due to the message modifications made during relaying of the information through fake base station 105-f.

UE 115-b may perform a connection procedure based on the received first set of information. This connection procedure may involve a RACH procedure, an RRC configuration procedure, or both as described with respect to the connection procedure 315 of FIG. 3. The connection procedure may include 415, 420, 425, 430, and 435 as described herein.

At 415, UE 115-c may transmit a RACH request to a base station 105 in order to connect to the base station 105. This base station 105 may be an example of a fake base station 105-f or a verified base station 105-e. At 420, UE 115-c may receive a RACH response from the base station 105 in response to the RACH request. At 425, UE 115-c may transmit an RRC connection request to the base station 105, and may receive an RRC connection setup message in response at 430. UE 115-c may update an RRC connection based on the received RRC connection setup message and, at 435, may transmit an RRC connection setup complete message in response.

To support information protection and fake base station 105 detection, UE 115-c may transmit a secure indication of the first set of information received by UE 115-c at 410 during the connection procedure. This indication may be an example of a hash value or a request for re-transmission as described with reference to FIG. 3. UE 115-c may transmit the indication to a base station 105 as a component of the RACH request, the RRC connection request, or the RRC connection setup complete message. Although these messages may be examples of unprotected messages (e.g., the messages transmitted by UE 115-c at 415, 425, and 435 may lack protection via ciphering, integrity protection, or both), UE 115-c may partially protect a message using the UE-specific key provisioned to UE 115-c. For example, UE 115-c may perform partial ciphering on an initial AS message to protect at least the indication of the first set of information. UE 115-c may additionally perform integrity protection on the entire message for improved protection.

To perform this partial protection, UE 115-c may derive one or more initial AS security protection keys from the UE-specific key received from the network entity 405 (e.g., previously in a registration accept message). UE 115-c may derive an initial AS encryption key, $K_{INIT\_AS\_Enc}$, an initial AS integrity protection key, $K_{INIT\_AS\_Int}$, or both based on a provisioned UE-specific initial AS key, $K_{INIT\_AS\_UE}$. In some cases, the initial AS security protection key(s) may be derived from an intermediate key, rather than directly from the UE-specific key. For example, UE 115-c may derive a temporary initial AS key, $K_{temp\_INIT\_AS}$, based on the UE-specific key and a freshness parameter. UE 115-c may implement a key derivation function (KDF), such that:

$$K_{temp\_INIT\_AS} = KDF(K_{INIT\_AS\_UE}, \text{freshness parameter}), \quad (1)$$

where the freshness parameter may be the SFN value for the information indicated by the secure indication, a pseudo-random number (e.g., generated by a random number generator at UE 115-c), or a combination thereof. UE 115-c may provide freshness parameter to the base station 105 along with the secure indication. However, the freshness parameter may be unprotected, such that a verified base station 105-e may receive the freshness parameter and may determine the temporary key using the freshness parameter. Additionally or alternatively, UE 115-c may determine one or more initial AS security protection keys based on an algorithm type and/or algorithm identifier. For example:

$$K_{INIT\_AS\_Enc,int} = KDF(K_{INIT\_AS\_UE}, \text{algorithm type, algorithm} ID) \quad (2)$$

The algorithm type, algorithm identifier, or both may be pre-configured at UE 115-c, previously provisioned by the network, or dynamically selected by the UE 115-c and included (unprotected) along with the secure indication in the transmission. UE 115-c may use the derived keys to protect the indication of the first set of information in the initial AS transmission (e.g., using a $K_{INIT\_AS\_Enc}$ for ciphering the information, a $K_{INIT\_AS\_Int}$ for integrity protecting the information, or both).

A network-verified base station 105-e may receive the initial AS message (e.g., the RACH request, RRC connection request, or RRC connection setup complete message) and may derive the one or more initial AS security protection keys needed to determine the indication of the first set of information. For example, the network entity 405 may provision the verified base station 105-e with a master initial AS key, $K_{INIT\_AS}$. Base station 105-e may derive the UE-specific initial AS key, $K_{INIT\_AS\_UE}$, from the master key, $K_{INIT\_AS}$, and the identity of the UE 115-c (e.g., one or more UE identifiers, such as a GUTI, S-TMSI, TMSI). Using the derived UE-specific key, the base station 105-e may derive the one or more initial AS security protection keys (in some cases, based on an intermediate key, such as the $K_{temp\_INIT\_AS}$) using the parameters received from UE 115-c and the same KDF(s). Once base station 105-e derives the keys used to protect the indication, base station 105-e may determine the protected indication using the one or more initial AS security protection keys (e.g., using the $K_{INIT\_AS\_Enc}$ to decipher the information, the $K_{INIT\_AS\_Int}$ to reverse integrity protection for the information, or both). As the network does not provision the master key and/or key index to fake base stations 105, a fake base station 105-f receiving the initial AS message may not be able to derive the keys used to protect the indication of the first set of information. As such, a fake base station 105-f may not be able to modify the indication of the first set of information. Accordingly, verified base station 105-e may correctly receive the indication of the first set of information received by UE 115-c at 410.

At 440, in some cases, base station 105-e may determine whether the UE 115-c received the correct first set of information (e.g., system information) at 410. For example, if base station 105-e decrypts the indication received in the initial AS message, where the indication is a hash value of the information received by UE 115-c at 410, base station 105-e may compare the information transmitted to UE 115-c at 410 to the information received by UE 115-c at 410. If these sets of information do not match, base station 105-e may determine that the information received at UE 115-c was modified, for example, by a fake base station 105-f In these cases, base station 105-e may re-transmit the first set of information to UE 115-c in a protected message (e.g., where the re-transmitted information is protected via ciphering, integrity protection, or both). Additionally or alternatively, base station 105-e may identify a request for re-transmission in the decrypted indication and may re-transmit the first set of information to UE 115-c in a protected message based on this request. Further, if base station 105-e determines that system information for the network has changed since UE 115-c received the system information at 410, base station 105-e may re-transmit the system information (e.g., now the updated system information) to UE 115-c.

In a first example, base station 105-e may re-transmit the information in an RRC re-configuration message. UE 115-c may transmit a registration and/or service request at 450, the network may perform authentication at 455, and base station 105-e may transmit the RRC re-configuration message, including the first set of information, at 460. In this example, at 465, UE 115-c may determine authenticity of the information initially received by UE 115-c at 410 based on the re-transmitted information. For example, if the two sets of information are different, UE 115-c may determine that the information received at 410 is inauthentic and may determine to detach from the connected base station 105 (e.g., fake base station 105-f). If the two sets of information match (or if UE 115-c did not receive a re-transmission of information in the RRC re-configuration message), UE 115-c may continue the network access procedure. For example, UE 115-c may re-configure the RRC configuration and transmit an RRC re-configuration complete message at 470. UE 115-c may then communicate with the network using the connected base station 105 (e.g., verified base station 105-e).

In a second example, base station 105-e and UE 115-c may use an RRC message to indicate detection of a base station 105 during connection setup. In some cases, base station 105-e may transmit the RRC detection message at 445 to UE 115-c. In these cases, the RRC message may include the re-transmission of information for UE 115-c and UE 115-c may determine the authenticity of received system information based on the re-transmitted information. Alternatively, UE 115-c may transmit an RRC message (e.g., an RRC detection message) as an initial step of a connection procedure (e.g., prior to a RACH procedure, prior to an RRC connection procedure, and/or prior to a registration or service procedure). A registered UE 115-c may be configured to transmit this RRC message at the start of any connection procedure. The RRC message may be protected using one or more initial AS keys. The UE 115-c may monitor for an expected response from the base station 105. If UE 115-c does not receive the expected response, UE 115-c may identify an abnormal call flow and may indirectly determine that the base station 105 is a fake base station 105. In these cases, UE 115-c may not perform the connection procedure with the identified fake base station 105 and instead may continue searching for a different base station 105 to connect to. For example, if a fake base station 105-f receives the protected RRC message, the fake base station 105-f may not be able to determine the protected information, as the fake base station 105-f is not provisioned with information needed to determine the one or more initial AS keys. As such, the fake base station 105-f may not determine how to respond to the RRC message. However, if a verified base station 105-e receives the protected RRC message, the verified base station 105-e may be provisioned with information to determine the one or more initial AS keys. As such, the verified base station 105-e may determine the protected information and may respond accordingly, implicitly indicating to the UE 115-c that the UE 115-c is initiating a connection procedure with a verified base station 105 (and not a fake base station).

In some cases, once UE 115-c has network access (e.g., via a verified base station 105-e), the network may provision an updated UE-specific key to UE 115-c at 475. For example, the network entity 405 may update a master key to a new version and may derive an updated UE-specific key using this updated master key. The base station 105-e may forward the updated UE-specific key, the updated key index, or both from the network entity 405 to the UE 115-c. The UE 115-c may remove the previous UE-specific key from memory and replace it with the updated UE-specific key. Additionally, the network entity 405 may provision the base station 105-e with the updated master key, the updated key index, or both (e.g., when provisioning the UE 115-c or when base station 105-e receives a message protected using a UE-specific key). The updated UE-specific key may be sent to UE 115-c in a secure NAS message, such as a registration and/or service accept message.

Figure 5:
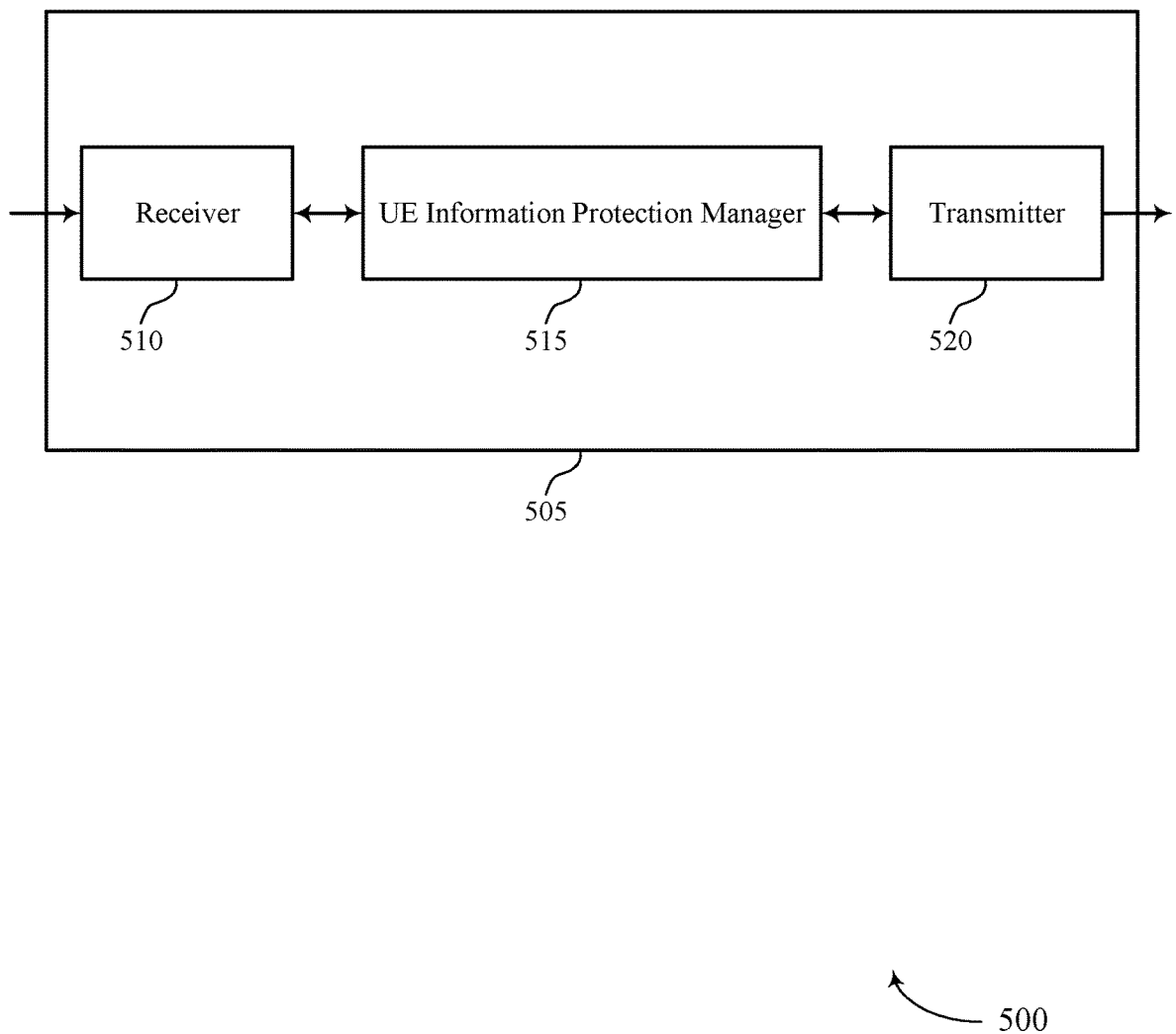
FIGS. 5 and 6 show block diagrams of devices that support information protection to detect fake base stations in accordance with aspects of the present disclosure.

FIG. 5 shows a block diagram 500 of a device 505 that supports information protection to detect fake base stations in accordance with aspects of the present disclosure. The device 505 may be an example of aspects of a UE 115 as described herein. The device 505 may include a receiver 510, a UE information protection manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information, such as protected information, related to detecting fake base stations). Information may be passed on to other components of the device 505. The receiver 510 may be an example of aspects of the transceiver 820 described with reference to FIG. 8. The receiver 510 may utilize a single antenna or a set of antennas.

The UE information protection manager 515 may receive, from a base station, a first set of information associated with communicating with a network, where the first set of information lacks protection via ciphering, integrity protection, or a combination thereof, and may transmit, to the base station, an indication of the first set of information, where the indication is protected via ciphering, integrity protection, or a combination thereof. The UE information protection manager 515 may determine authenticity of the first set of information based on whether a second set of information associated with communicating with the network is received from the base station that is different from the first set of information and may communicate with the network based on the determining. The UE information protection manager 515 may be an example of aspects of the UE information protection manager 810 described herein.

The UE information protection manager 515, or its sub-components, may be implemented in hardware, code (e.g., software or firmware) executed by a processor, or any combination thereof. If implemented in code executed by a processor, the functions of the UE information protection manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE information protection manager 515, or its sub-components, may be physically located at various positions, including being distributed such that portions of functions are implemented at different physical locations by one or more physical components. In some examples, the UE information protection manager 515, or its sub-components, may be a separate and distinct component in accordance with various aspects of the present disclosure. In some examples, the UE information protection manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
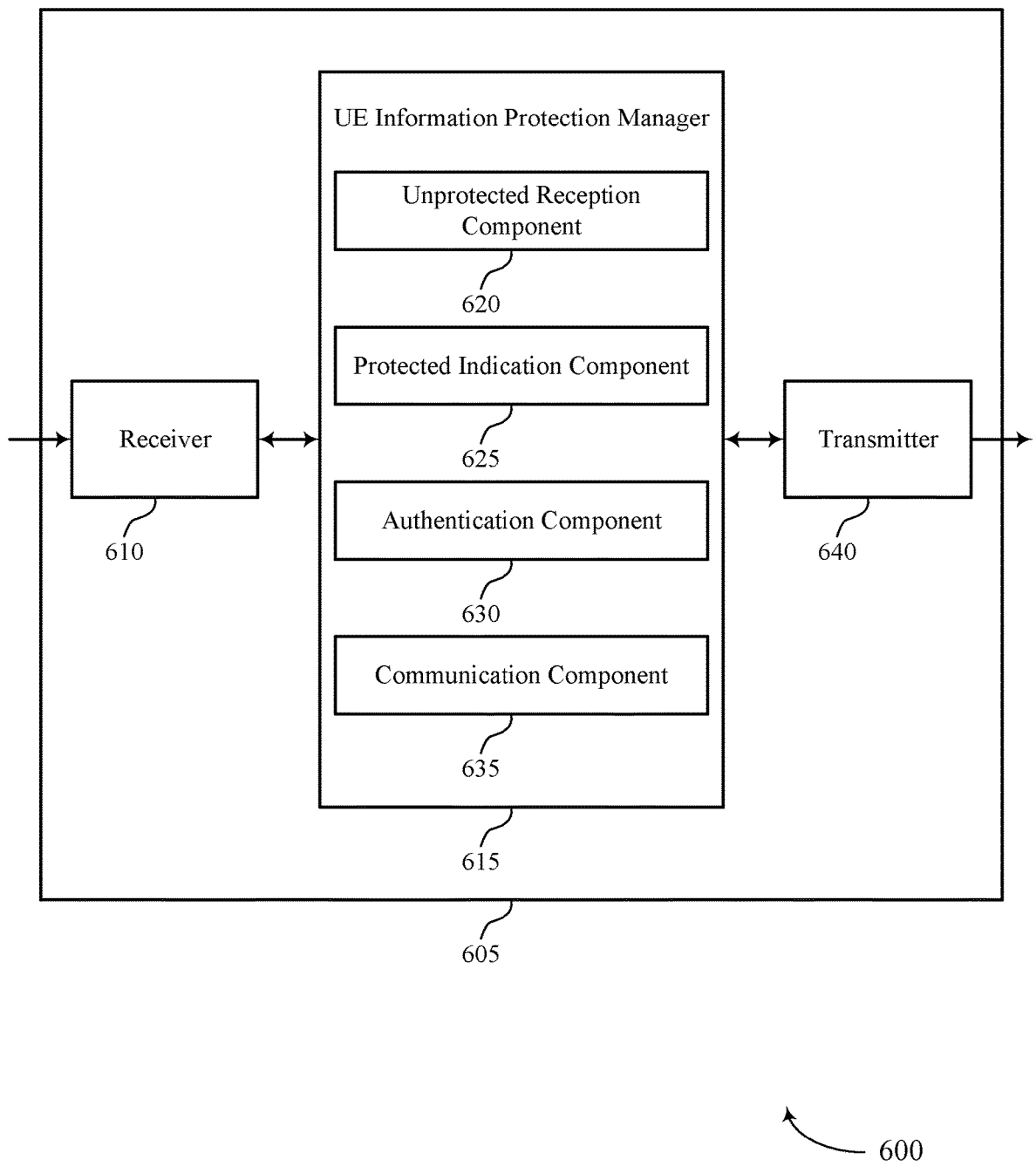

FIG. 6 shows a block diagram 600 of a device 605 that supports information protection to detect fake base stations in accordance with aspects of the present disclosure. The device 605 may be an example of aspects of a device 505 or a UE 115 as described herein. The device 605 may include a receiver 610, a UE information protection manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information, such as protected information, related to detecting fake base stations). Information may be passed on to other components of the device 605. The receiver 610 may be an example of aspects of the transceiver 820 described with reference to FIG. 8. The receiver 610 may utilize a single antenna or a set of antennas.

The UE information protection manager 615 may be an example of aspects of the UE information protection manager 515 as described herein. The UE information protection manager 615 may include an unprotected reception component 620, a protected indication component 625, an authentication component 630, and a communication component 635. The UE information protection manager 615 may be an example of aspects of the UE information protection manager 810 described herein.

The unprotected reception component 620 may receive, from a base station, a first set of information associated with communicating with a network, where the first set of information lacks protection via ciphering, integrity protection, or a combination thereof. The protected indication component 625 may transmit, to the base station, an indication of the first set of information, where the indication is protected via ciphering, integrity protection, or a combination thereof. The authentication component 630 may determine authenticity of the first set of information based on whether a second set of information associated with communicating with the network is received from the base station that is different from the first set of information. The communication component 635 may communicate with the network based on the determining.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
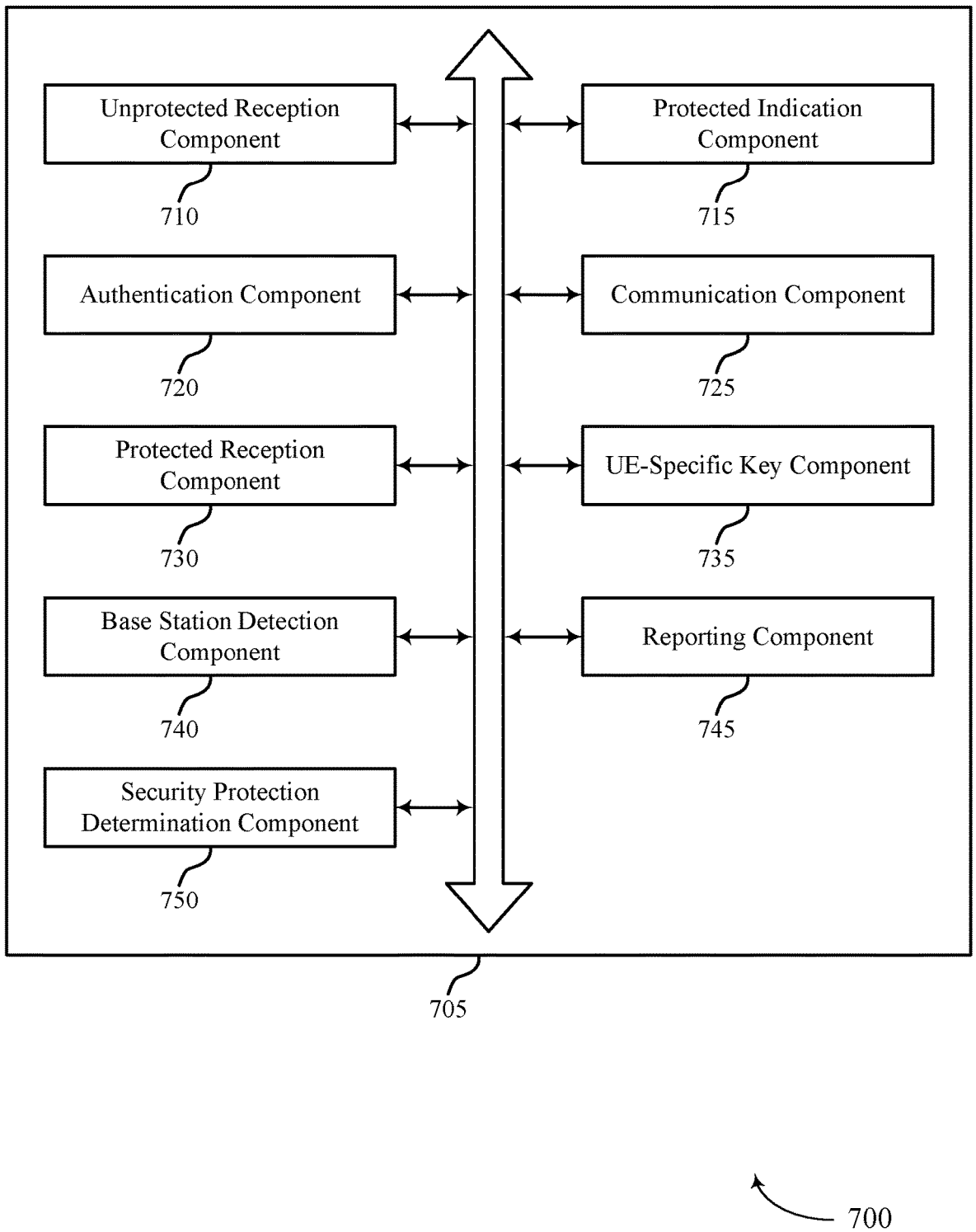
FIG. 7 shows a block diagram of a UE information protection manager that supports information protection to detect fake base stations in accordance with aspects of the present disclosure.

FIG. 7 shows a block diagram 700 of a UE information protection manager 705 that supports information protection to detect fake base stations in accordance with aspects of the present disclosure. The UE information protection manager 705 may be an example of aspects of a UE information protection manager 515, a UE information protection manager 615, or a UE information protection manager 810 described herein. The UE information protection manager 705 may include an unprotected reception component 710, a protected indication component 715, an authentication component 720, a communication component 725, a protected reception component 730, a UE-specific key component 735, a base station detection component 740, a reporting component 745, and a security protection determination component 750. Each of these modules may communicate, directly or indirectly, with one another (e.g., via one or more buses).

The UE information protection manager 705 may be a component of a UE. The unprotected reception component 710 may receive, from a base station, a first set of information associated with communicating with a network, where the first set of information lacks protection via ciphering, integrity protection, or a combination thereof. In some cases, the first set of information includes a first MIB, a first set of SIBs, or a combination thereof.

The protected indication component 715 may transmit, to the base station, an indication of the first set of information, where the indication is protected via ciphering, integrity protection, or a combination thereof. In some cases, the UE is an example of an unregistered UE without a valid NAS security context. The indication of the first set of information may be transmitted in an AS security mode complete message.

The authentication component 720 may determine authenticity of the first set of information based on whether a second set of information associated with communicating with the network is received from the base station that is different from the first set of information. In some cases, the second set of information includes a second MIB, a second set of SIBs, or a combination thereof. The communication component 725 may communicate with the network based on the determining.

In some cases, the determining includes determining that the first set of information is authentic. In these cases, the communicating may include communicating with the network via the base station based on the determining that the first set of information is authentic.

In other cases, the determining includes determining that the first set of information is inauthentic. In these cases, the communication component 725 may detach from the base station based on the determining that the first set of information is inauthentic and may reattach to an additional base station. The communication component 725 may communicate with the network via the additional base station. In some cases, the reporting component 745 may report, to the additional base station, an identity of the base station, at least a portion of the first information, or a combination thereof based on the determining that the first set of information is inauthentic.

The protected reception component 730 may receive, from the base station, the second set of information, where the second set of information is protected via ciphering, integrity protection, or a combination thereof. In some examples, the protected reception component 730 may compare the second set of information with the first set of information, where the determining is based on the comparing. In some cases, the second set of information is received in an RRC re-configuration message.

In some examples, the indication may be an example of a hash value based on the first set of information and an SFN value associated with the first set of information. In these examples, the protected reception component 730 may receive, from the base station, the second set of information if the second set of information is different from the first set of information. In other examples, the indication is an example of a request for the second set of information. In these examples, the protected reception component 730 may receive, from the base station, the second set of information based on the request for the second set of information.

The UE-specific key component 735 may receive a UE-specific key for an initial AS message, where the UE-specific key is based on one or more identifiers of the UE. In some examples, the UE-specific key component 735 may receive a key index value associated with the UE-specific key and may transmit the key index value with the indication of the first set of information. In some cases, the one or more identifiers of the UE include a GUTI, an S-TMSI, a TMSI, or a combination thereof. In some cases, the UE-specific key is received in a secure NAS message.

In some examples, the UE is an example of a registered UE with a valid NAS security context. Transmitting the indication of the first set of information may involve the protected indication component 715 security protecting the indication of the first set of information based on the UE-specific key, where the security protecting involves encrypting the indication of the first set of information, integrity protecting the indication of the first set of information, or a combination thereof. In some cases, the indication of the first set of information is transmitted in an RRC connection message.

In some examples, security protecting the indication may involve the UE-specific key component 735 deriving a temporary encryption key for the initial AS message based on the UE-specific key, a pseudo-random number, an algorithm identifier, or a combination thereof. In some examples, the UE-specific key component 735 may encrypt the indication of the first set of information using the temporary encryption key and an SFN value associated with the first set of information and may transmit, to the base station, an indication of the SFN value and the pseudo-random number, the algorithm identifier, or a combination thereof.

In some examples, the UE-specific key component 735 may receive an updated UE-specific key for the initial AS message, where the updated UE-specific key is based on the one or more identifiers of the UE, a key index, or a combination thereof.

In some cases, the base station detection component 740 may detect an additional base station. The base station detection component 740 may transmit, to the additional base station, an initial RRC connection setup message indicating detection of the additional base station, where the initial RRC connection setup message is security protected based on the UE-specific key, and may determine whether the additional base station is an authorized base station of the network based on the initial RRC connection setup message.

The security protection determination component 750 may receive, from the base station, an indication that security protection for the first set of information is enabled. In some cases, the indication that security protection for the first set of information is enabled is received in a NAS security mode command message.

Figure 8:
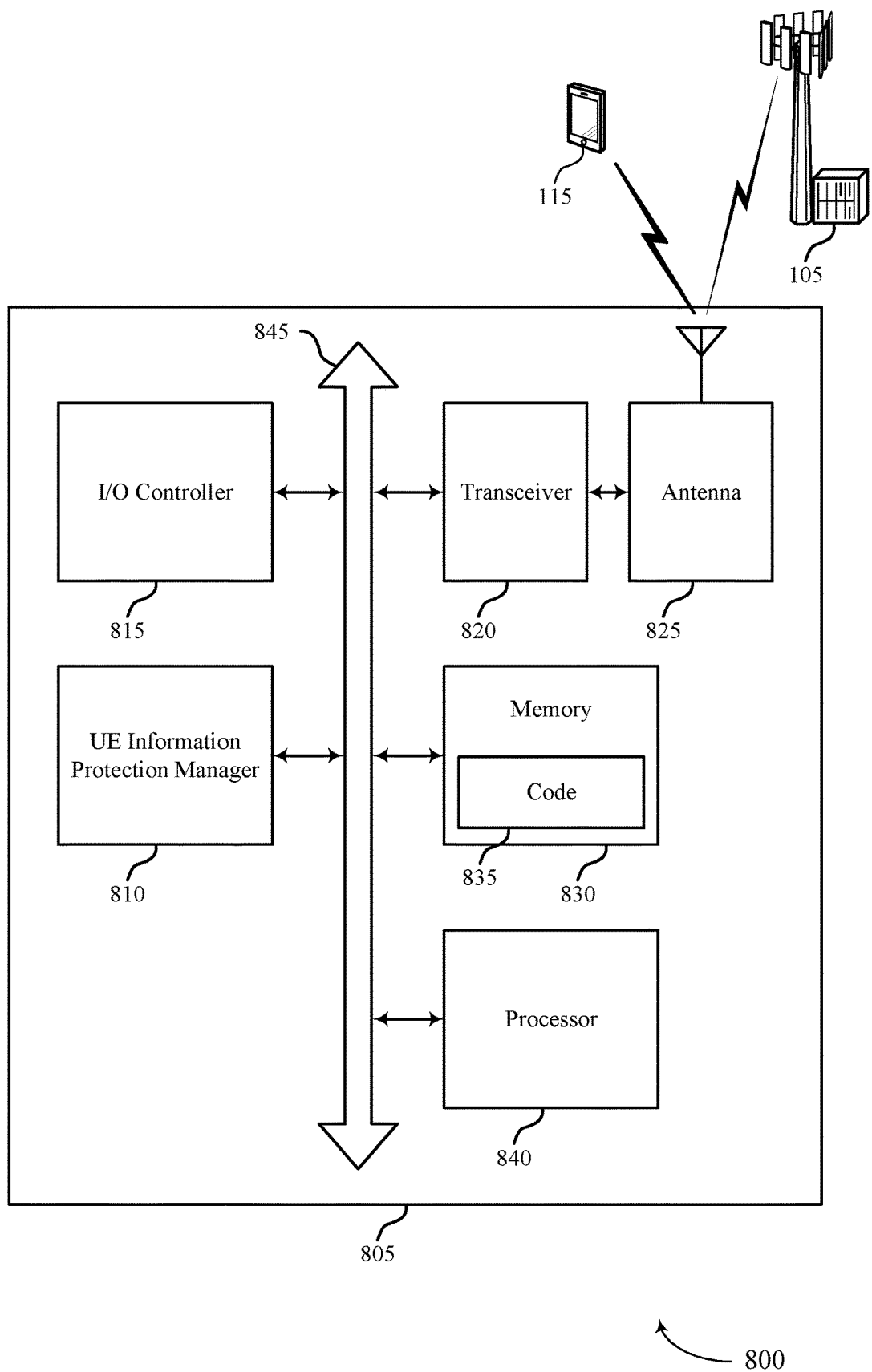
FIG. 8 shows a diagram of a system including a device that supports information protection to detect fake base stations in accordance with aspects of the present disclosure.

FIG. 8 shows a diagram of a system 800 including a device 805 that supports information protection to detect fake base stations in accordance with aspects of the present disclosure. The device 805 may be an example of or include the components of device 505, device 605, or a UE 115 as described herein. The device 805 may include components for bi-directional voice and data communications including components for transmitting and receiving communications, including a UE information protection manager 810, an I/O controller 815, a transceiver 820, an antenna 825, memory 830, and a processor 840. These components may be in electronic communication via one or more buses (e.g., bus 845).

The UE information protection manager 810 may receive, from a base station, a first set of information associated with communicating with a network, where the first set of information lacks protection via ciphering, integrity protection, or a combination thereof, and may transmit, to the base station, an indication of the first set of information, where the indication is protected via ciphering, integrity protection, or a combination thereof. The UE information protection manager 810 may determine authenticity of the first set of information based on whether a second set of information associated with communicating with the network is received from the base station that is different from the first set of information and may communicate with the network based on the determining.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases, the device may have more than one antenna 825, which may be capable of concurrently transmitting or receiving multiple wireless transmissions.

The memory 830 may include random access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting information protection to detect fake base stations).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
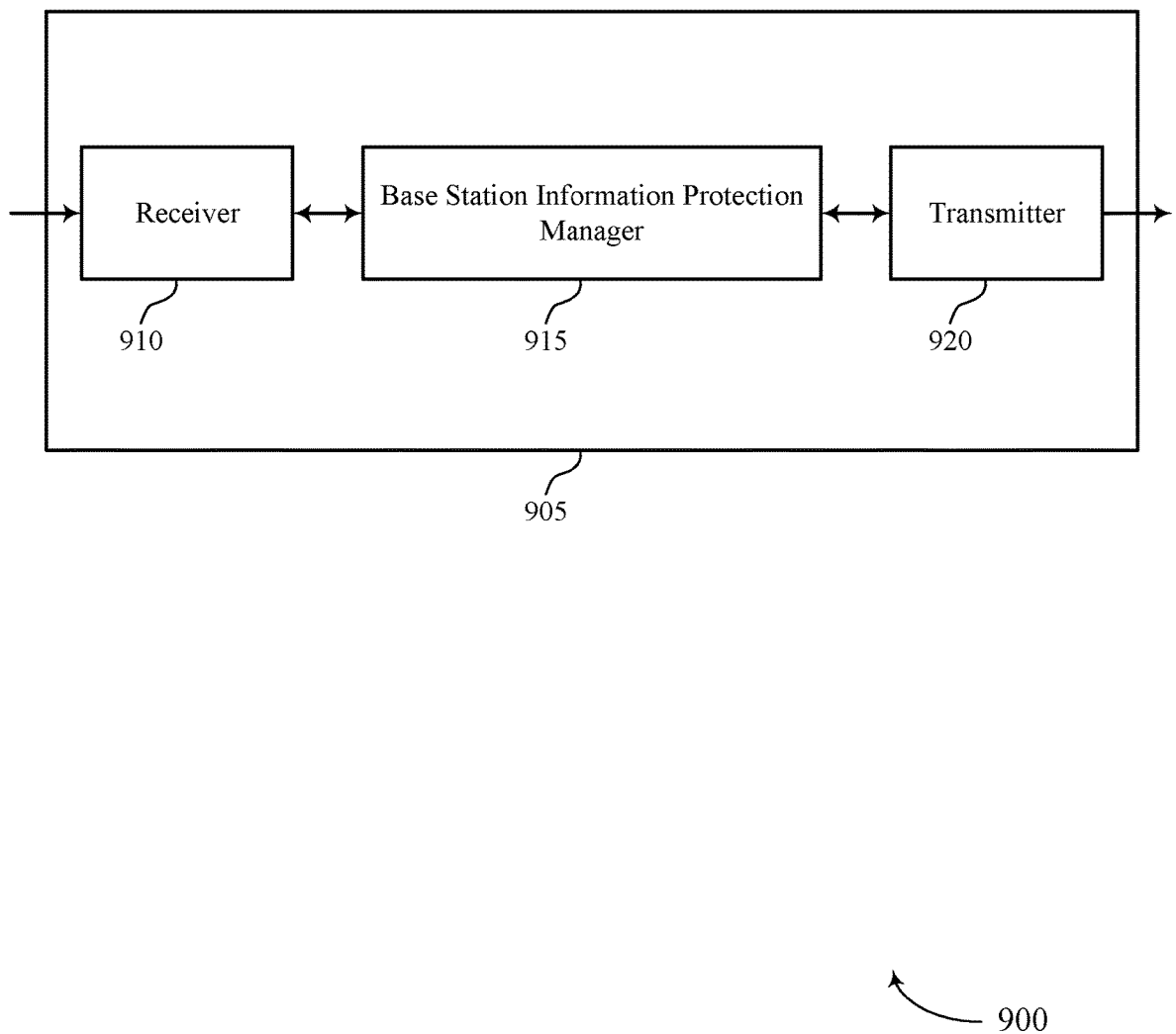
FIGS. 9 and 10 show block diagrams of devices that support information protection to detect fake base stations in accordance with aspects of the present disclosure.

FIG. 9 shows a block diagram 900 of a device 905 that supports information protection to detect fake base stations in accordance with aspects of the present disclosure. The device 905 may be an example of aspects of a base station 105 as described herein. The device 905 may include a receiver 910, a base station information protection manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information, such as protected information, related to detecting fake base stations). Information may be passed on to other components of the device 905. The receiver 910 may be an example of aspects of the transceiver 1220 described with reference to FIG. 12. The receiver 910 may utilize a single antenna or a set of antennas.

The base station information protection manager 915 may transmit, to a UE, a first set of information associated with communicating with a network, where the first set of information lacks protection via ciphering, integrity protection, or a combination thereof, and may receive, from the UE, an indication of a second set of information received at the UE and associated with communicating with the network, where the indication is protected via ciphering, integrity protection, or a combination thereof. The base station information protection manager 915 may determine whether to re-transmit, to the UE, the first set of information in a protected message based on the indication of the second set of information, where the protected message is protected via ciphering, integrity protection, or a combination thereof, and may communicate with the UE based on whether the first set of information is different from the second set of information. The base station information protection manager 915 may be an example of aspects of the base station information protection manager 1210 described herein.

The base station information protection manager 915, or its sub-components, may be implemented in hardware, code (e.g., software or firmware) executed by a processor, or any combination thereof. If implemented in code executed by a processor, the functions of the base station information protection manager 915, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station information protection manager 915, or its sub-components, may be physically located at various positions, including being distributed such that portions of functions are implemented at different physical locations by one or more physical components. In some examples, the base station information protection manager 915, or its sub-components, may be a separate and distinct component in accordance with various aspects of the present disclosure. In some examples, the base station information protection manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
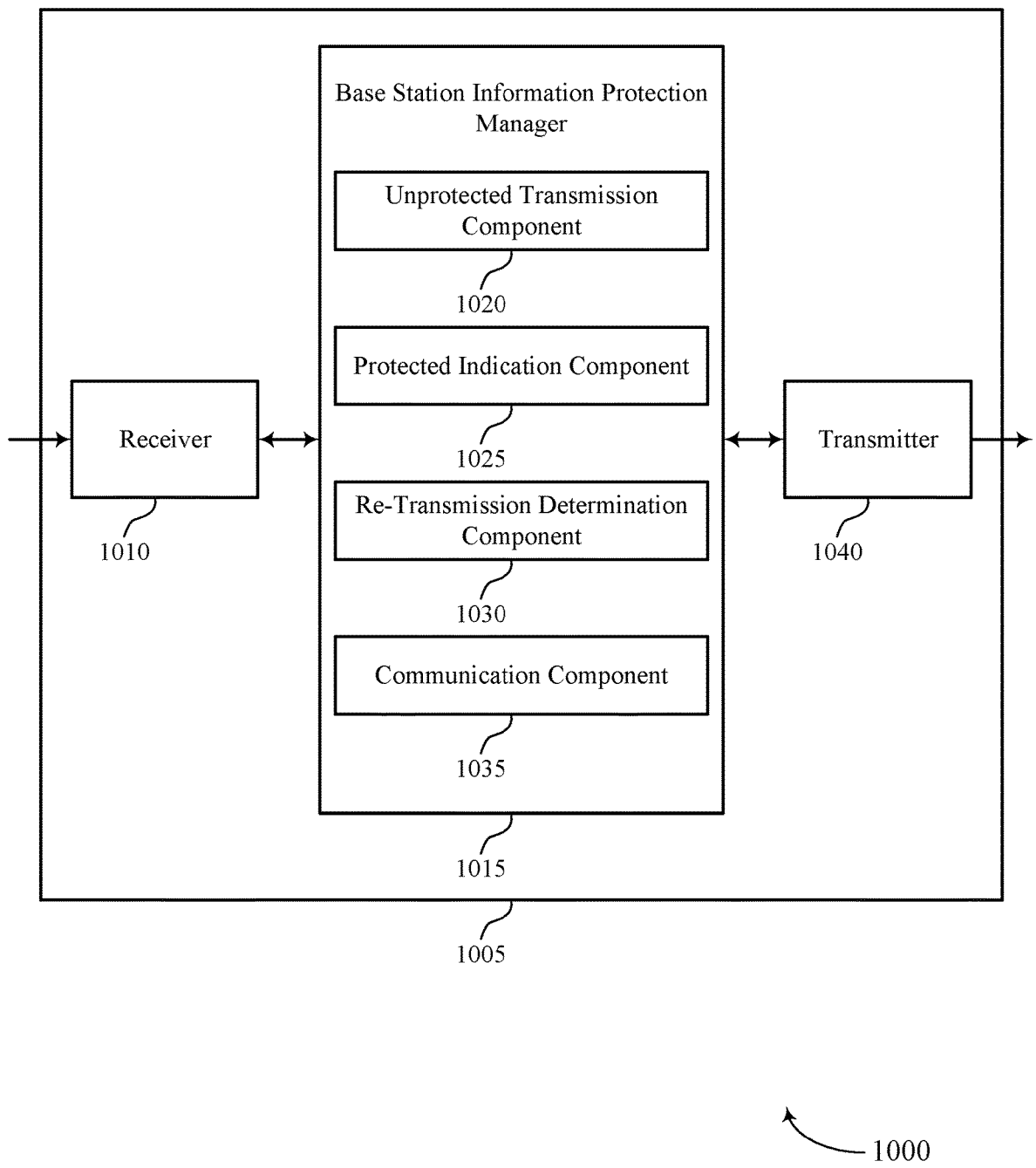

FIG. 10 shows a block diagram 1000 of a device 1005 that supports information protection to detect fake base stations in accordance with aspects of the present disclosure. The device 1005 may be an example of aspects of a device 905 or a base station 105 as described herein. The device 1005 may include a receiver 1010, a base station information protection manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information, such as protected information, related to detecting fake base stations). Information may be passed on to other components of the device 1005. The receiver 1010 may be an example of aspects of the transceiver 1220 described with reference to FIG. 12. The receiver 1010 may utilize a single antenna or a set of antennas.

The base station information protection manager 1015 may be an example of aspects of the base station information protection manager 915 as described herein. The base station information protection manager 1015 may include an unprotected transmission component 1020, a protected indication component 1025, a re-transmission determination component 1030, and a communication component 1035. The base station information protection manager 1015 may be an example of aspects of the base station information protection manager 1210 described herein.

The unprotected transmission component 1020 may transmit, to a UE, a first set of information associated with communicating with a network, where the first set of information lacks protection via ciphering, integrity protection, or a combination thereof. The protected indication component 1025 may receive, from the UE, an indication of a second set of information received at the UE and associated with communicating with the network, where the indication is protected via ciphering, integrity protection, or a combination thereof. The re-transmission determination component 1030 may determine whether to re-transmit, to the UE, the first set of information in a protected message based on the indication of the second set of information, where the protected message is protected via ciphering, integrity protection, or a combination thereof. The communication component 1035 may communicate with the UE based on whether the first set of information is different from the second set of information.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
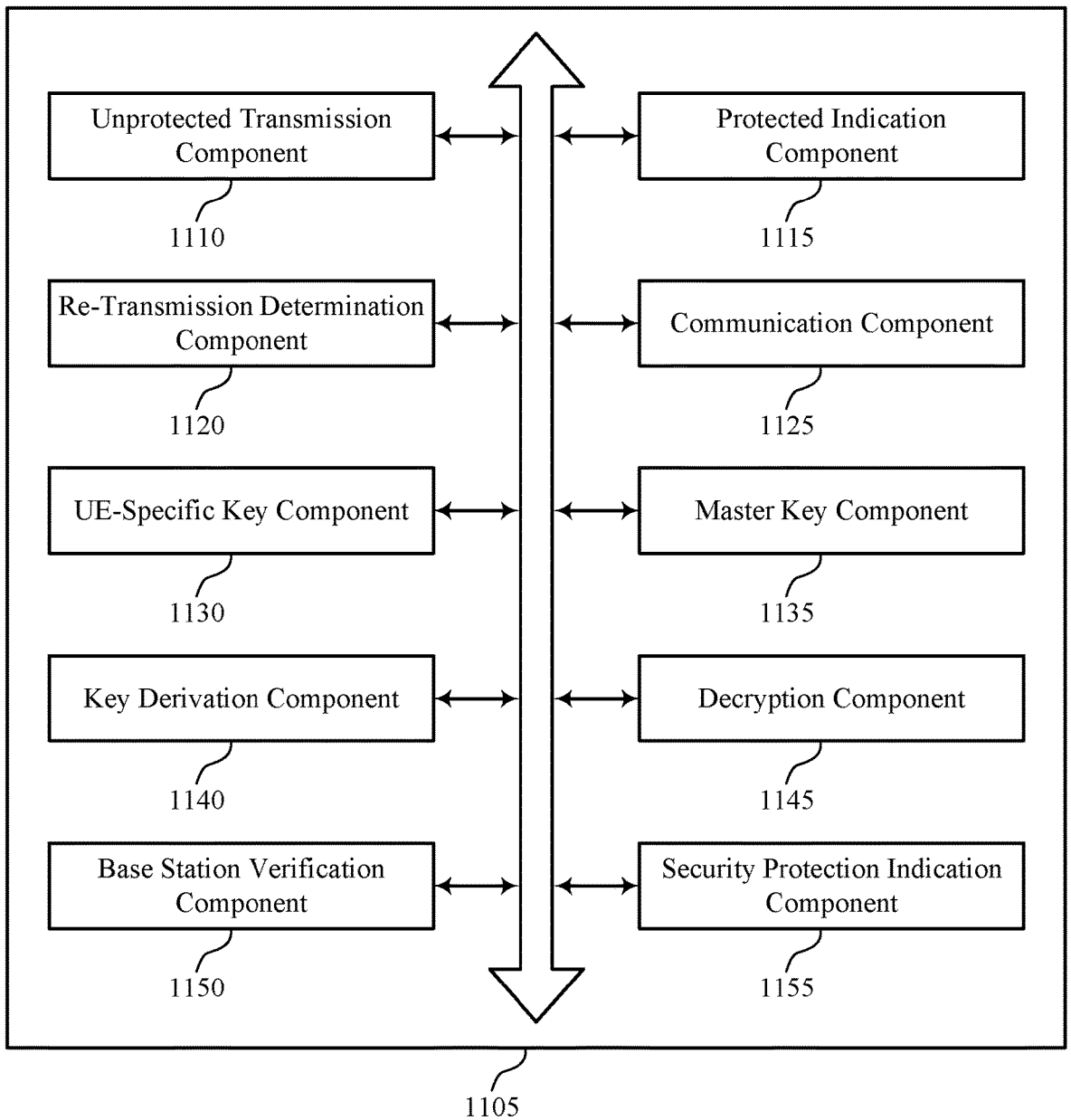
FIG. 11 shows a block diagram of a base station information protection manager that supports information protection to detect fake base stations in accordance with aspects of the present disclosure.

FIG. 11 shows a block diagram 1100 of a base station information protection manager 1105 that supports information protection to detect fake base stations in accordance with aspects of the present disclosure. The base station information protection manager 1105 may be an example of aspects of a base station information protection manager 915, a base station information protection manager 1015, or a base station information protection manager 1210 described herein. The base station information protection manager 1105 may include an unprotected transmission component 1110, a protected indication component 1115, a re-transmission determination component 1120, a communication component 1125, a UE-specific key component 1130, a master key component 1135, a key derivation component 1140, a decryption component 1145, a base station verification component 1150, and a security protection indication component 1155. Each of these modules may communicate, directly or indirectly, with one another (e.g., via one or more buses).

The base station information protection manager 1105 may be a component of a base station. The unprotected transmission component 1110 may transmit, to a UE, a first set of information associated with communicating with a network, where the first set of information lacks protection via ciphering, integrity protection, or a combination thereof. In some cases, the first set of information includes a first MIB, a first set of SIBs, or a combination thereof.

The protected indication component 1115 may receive, from the UE, an indication of a second set of information received at the UE and associated with communicating with the network, where the indication is protected via ciphering, integrity protection, or a combination thereof. In some cases, the second set of information includes a second MIB, a second set of SIBs, or a combination thereof.

In some cases, the UE may be an example of an unregistered UE without a valid NAS security context. In these cases, the indication of the second set of information is received in an AS security mode complete message. In other cases, the UE may be an example of a registered UE with a valid NAS security context and the indication of the second set of information is protected based on a UE-specific key for an initial AS message. In some examples, the indication of the second set of information is additionally protected based on an SFN value. The indication of the second set of information may be received in an RRC connection message.

The re-transmission determination component 1120 may determine whether to re-transmit, to the UE, the first set of information in a protected message based on the indication of the second set of information, where the protected message is protected via ciphering, integrity protection, or a combination thereof. In some examples, the re-transmission determination component 1120 may re-transmit the first set of information in an RRC re-configuration message.

In some examples, the indication of the second set of information includes a hash value based on the second set of information and an SFN value associated with the second set of information. In these examples, the re-transmission determination component 1120 may identify the second set of information based on the hash value and may determine to re-transmit, to the UE, the first set of information in the protected message if the second set of information is different from the first set of information.

In other examples, the indication of the second set of information includes a request for the second set of information, where the first set of information corresponds to the second set of information. In these examples, the re-transmission determination component 1120 may re-transmit, to the UE, the first set of information in the protected message based on the request.

The communication component 1125 may communicate with the UE based on whether the first set of information is different from the second set of information.

The UE-specific key component 1130 may forward, from a network entity of the network to the UE, a UE-specific key for an initial AS message. In some cases, the UE-specific key is forwarded in a secure NAS message.

The master key component 1135 may receive, from the network entity, a master key for the initial AS message. The key derivation component 1140 may receive, from the UE, the initial AS message, where the initial AS message is protected based on the UE-specific key. In some examples, the key derivation component 1140 may derive the UE-specific key using the master key and one or more identifiers of the UE based on receiving the initial AS message.

In some examples, the master key component 1135 may receive, from the network entity, a key index associated with the master key, one or more security algorithms for the initial AS message, or a combination thereof. The master key component 1135 may forward, from the network entity and to the UE, the key index associated with the master key, the one or more security algorithms for the initial AS message, or a combination thereof. In some cases, the master key corresponds to an area associated with the network entity.

In some examples, the master key component 1135 may receive, from a network entity of the network, a master key for the initial AS message. Additionally, in some examples, the key derivation component 1140 may receive, from the UE, an indication of an SFN value, a pseudo-random number, an algorithm identifier, or a combination thereof. The key derivation component 1140 may derive the UE-specific key using the master key and one or more identifiers of the UE and may derive a temporary encryption key for the initial AS message based on the UE-specific key and the SFN value, the pseudo-random number, the algorithm identifier, or a combination thereof. The decryption component 1145 may decrypt the indication of the second information using the temporary encryption key.

In some examples, the master key component 1135 may receive, from the UE, a key index value associated with the UE-specific key and may identify the master key based on the key index value. In some examples, the master key component 1135 may receive, from a network entity of the network, an updated master key for the initial AS message and may forward, to the UE, an updated UE-specific key for the initial AS message, where the updated UE-specific key is based on one or more identifiers of the UE and the updated master key.

The base station verification component 1150 may receive, from the UE, a report indicating an identity of an additional base station, at least a portion of the second set of information, or a combination thereof based on the re-transmitted first set of information. In some examples, the base station verification component 1150 may verify whether the additional base station is authorized by the network based on the report.

The security protection indication component 1155 may transmit, to the UE, an indication that security protection for the first set of information is enabled. In some cases, the indication that security protection for the first set of information is enabled is transmitted in a NAS security mode command message.

Figure 12:
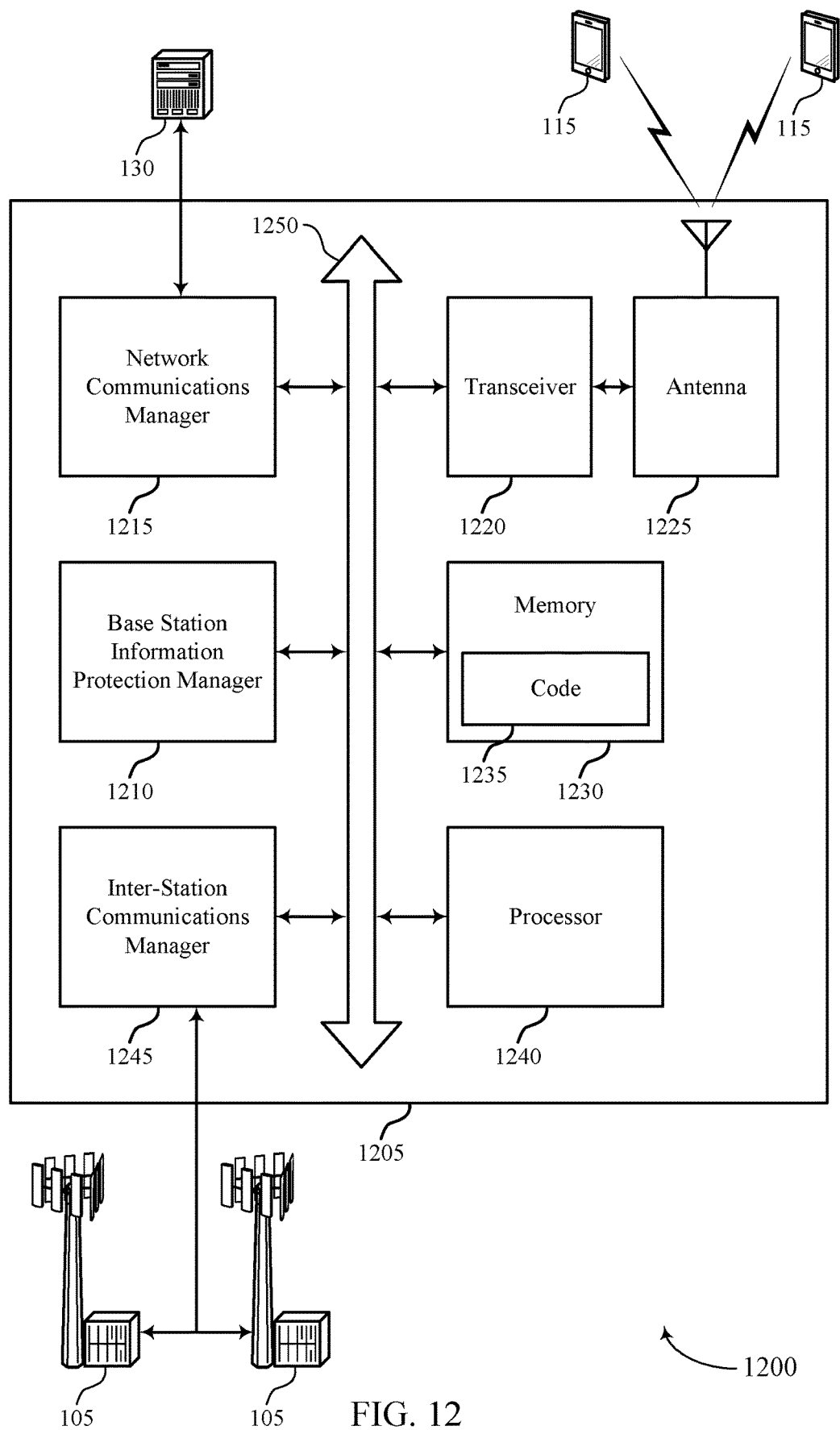
FIG. 12 shows a diagram of a system including a device that supports information protection to detect fake base stations in accordance with aspects of the present disclosure.

FIG. 12 shows a diagram of a system 1200 including a device 1205 that supports information protection to detect fake base stations in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a base station information protection manager 1210, a network communications manager 1215, a transceiver 1220, an antenna 1225, memory 1230, a processor 1240, and an inter-station communications manager 1245. These components may be in electronic communication via one or more buses (e.g., bus 1250).

The base station information protection manager 1210 may transmit, to a UE, a first set of information associated with communicating with a network, where the first set of information lacks protection via ciphering, integrity protection, or a combination thereof, and may receive, from the UE, an indication of a second set of information received at the UE and associated with communicating with the network, where the indication is protected via ciphering, integrity protection, or a combination thereof. The base station information protection manager 1210 may determine whether to re-transmit, to the UE, the first set of information in a protected message based on the indication of the second set of information, where the protected message is protected via ciphering, integrity protection, or a combination thereof, and may communicate with the UE based on whether the first set of information is different from the second set of information.

The network communications manager 1215 may manage communications with the core network 130 (e.g., via one or more wired backhaul links). For example, the network communications manager 1215 may manage the transfer of data communications for client devices, such as one or more UEs 115. The actions performed by the network communications manager as described herein may be implemented to realize one or more potential advantages. One implementation may allow a UE 115 to avoid certain attacks or scams and may support efficient communications. Another implementation may provide improved quality and reliability of service at the UE 115, as performance degradation due to fake base station attacks at the UE 115 may be reduced.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases, the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting information protection to detect fake base stations).

The inter-station communications manager 1245 may manage communications with other base stations 105 and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
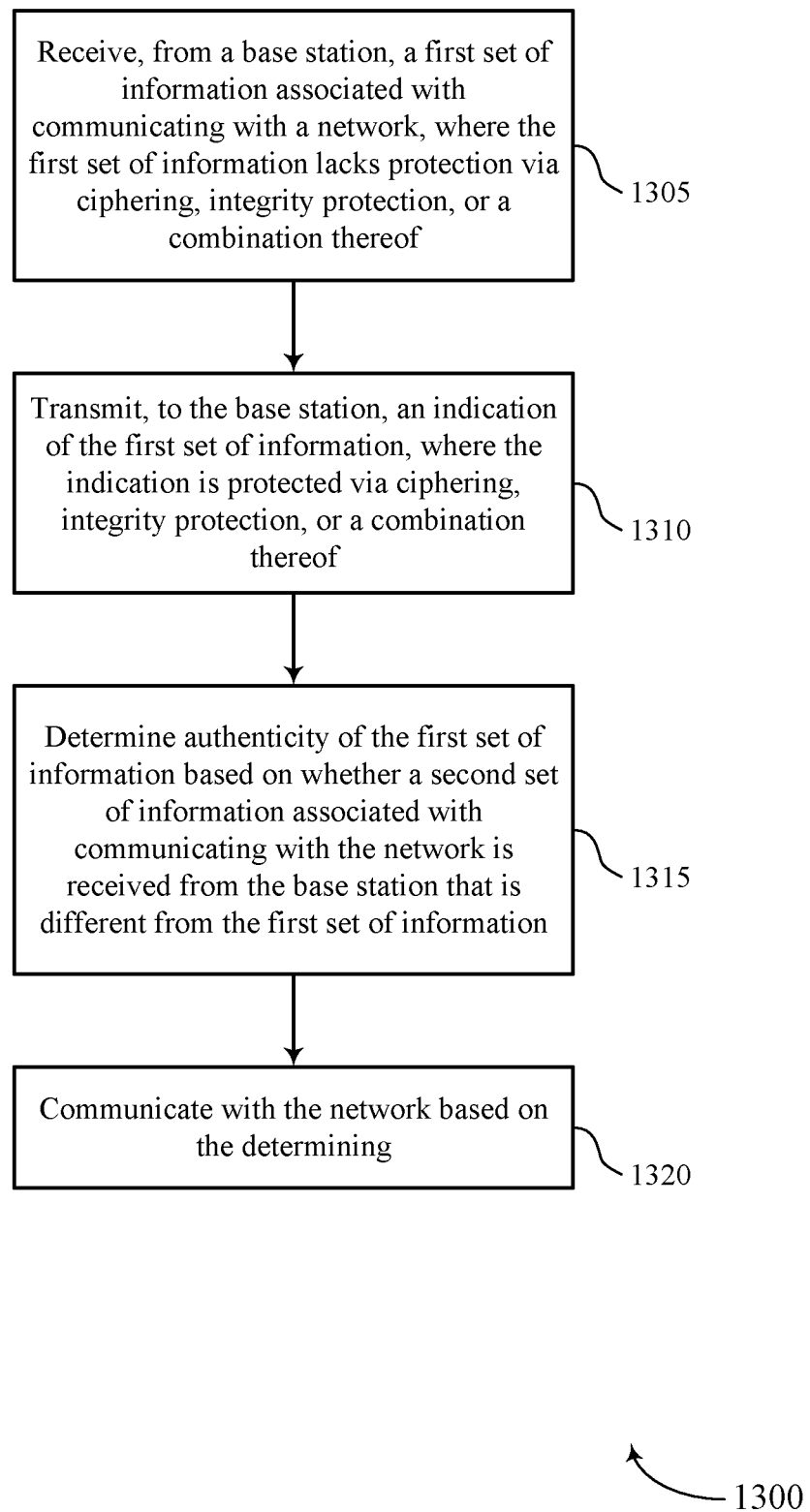
FIGS. 13 through 16 show flowcharts illustrating methods that support information protection to detect fake base stations in accordance with aspects of the present disclosure.

FIG. 13 shows a flowchart illustrating a method 1300 that supports information protection to detect fake base stations in accordance with aspects of the present disclosure. The operations of method 1300 may be implemented by a UE 115 or its components as described herein. For example, the operations of method 1300 may be performed by a UE information protection manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may receive, from a base station, a first set of information associated with communicating with a network, where the first set of information lacks protection via ciphering, integrity protection, or a combination thereof. The operations of 1305 may be performed according to the methods described herein. In some examples, aspects of the operations of 1305 may be performed by an unprotected reception component as described with reference to FIGS. 5 through 8.

At 1310, the UE may transmit, to the base station, an indication of the first set of information, where the indication is protected via ciphering, integrity protection, or a combination thereof. The operations of 1310 may be performed according to the methods described herein. In some examples, aspects of the operations of 1310 may be performed by a protected indication component as described with reference to FIGS. 5 through 8.

At 1315, the UE may determine authenticity of the first set of information based on whether a second set of information associated with communicating with the network is received from the base station that is different from the first set of information. The operations of 1315 may be performed according to the methods described herein. In some examples, aspects of the operations of 1315 may be performed by an authentication component as described with reference to FIGS. 5 through 8.

At 1320, the UE may communicate with the network based on the determining. The operations of 1320 may be performed according to the methods described herein. In some examples, aspects of the operations of 1320 may be performed by a communication component as described with reference to FIGS. 5 through 8.

Figure 14:
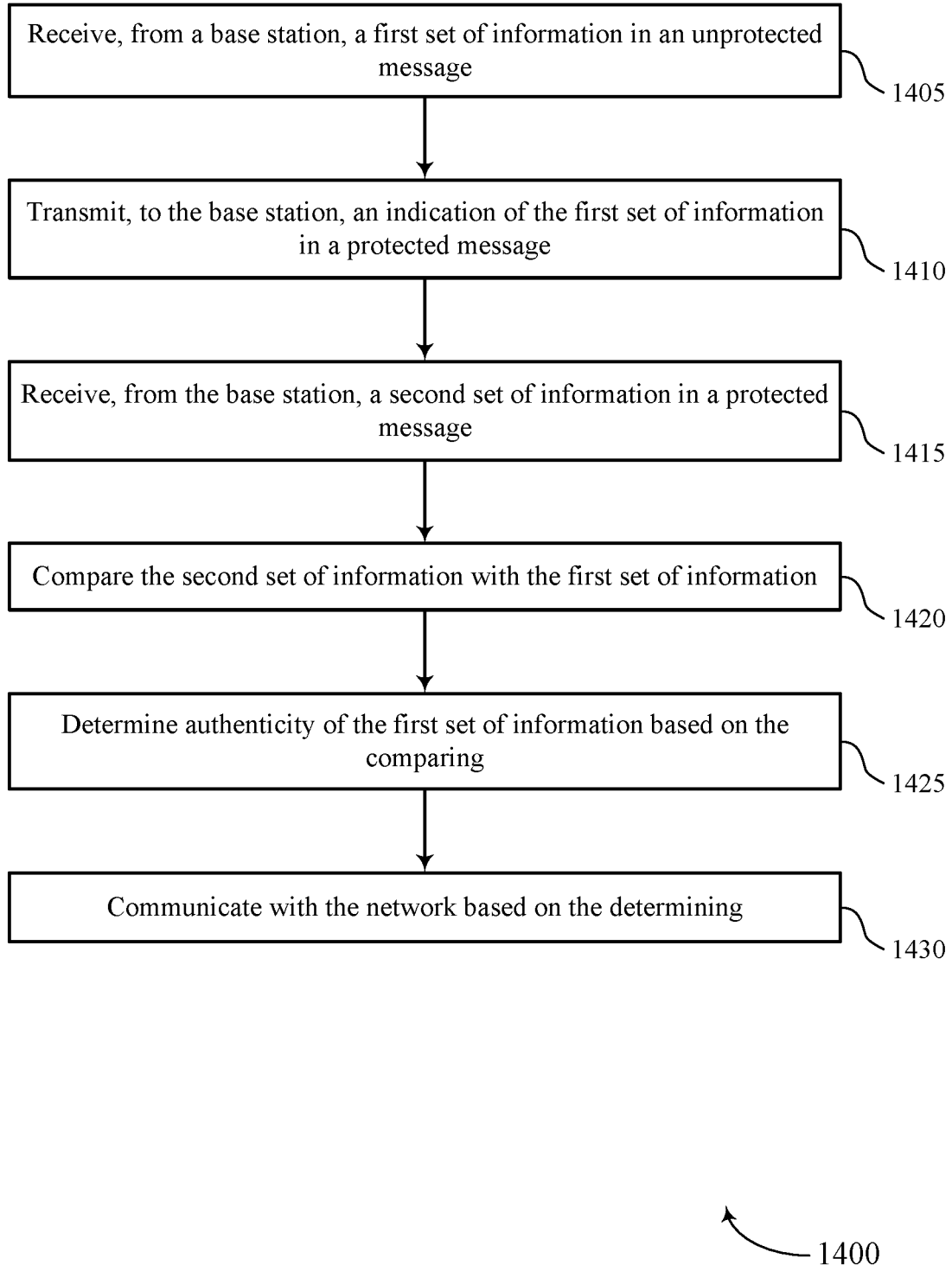

FIG. 14 shows a flowchart illustrating a method 1400 that supports information protection to detect fake base stations in accordance with aspects of the present disclosure. The operations of method 1400 may be implemented by a UE 115 or its components as described herein. For example, the operations of method 1400 may be performed by a UE information protection manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may receive, from a base station, a first set of information associated with communicating with a network, where the first set of information lacks protection via ciphering, integrity protection, or a combination thereof. The operations of 1405 may be performed according to the methods described herein. In some examples, aspects of the operations of 1405 may be performed by an unprotected reception component as described with reference to FIGS. 5 through 8.

At 1410, the UE may transmit, to the base station, an indication of the first set of information, where the indication is protected via ciphering, integrity protection, or a combination thereof. The operations of 1410 may be performed according to the methods described herein. In some examples, aspects of the operations of 1410 may be performed by a protected indication component as described with reference to FIGS. 5 through 8.

At 1415, the UE may receive, from the base station, a second set of information, where the second set of information is protected via ciphering, integrity protection, or a combination thereof. The operations of 1415 may be performed according to the methods described herein. In some examples, aspects of the operations of 1415 may be performed by a protected reception component as described with reference to FIGS. 5 through 8.

At 1420, the UE may compare the second set of information with the first set of information. The operations of 1420 may be performed according to the methods described herein. In some examples, aspects of the operations of 1420 may be performed by a protected reception component as described with reference to FIGS. 5 through 8. One example of an advantage of comparing the second set of information with the first set of information is that the UE may efficiently identify an attack from a fake base station and may avoid potential lapses in operation thereby maintaining operational efficiency.

At 1425, the UE may determine authenticity of the first set of information based on the received second set of information and the comparing. The operations of 1425 may be performed according to the methods described herein. In some examples, aspects of the operations of 1425 may be performed by an authentication component as described with reference to FIGS. 5 through 8.

At 1430, the UE may communicate with the network based on the determining. The operations of 1430 may be performed according to the methods described herein. In some examples, aspects of the operations of 1430 may be performed by a communication component as described with reference to FIGS. 5 through 8.

Figure 15:
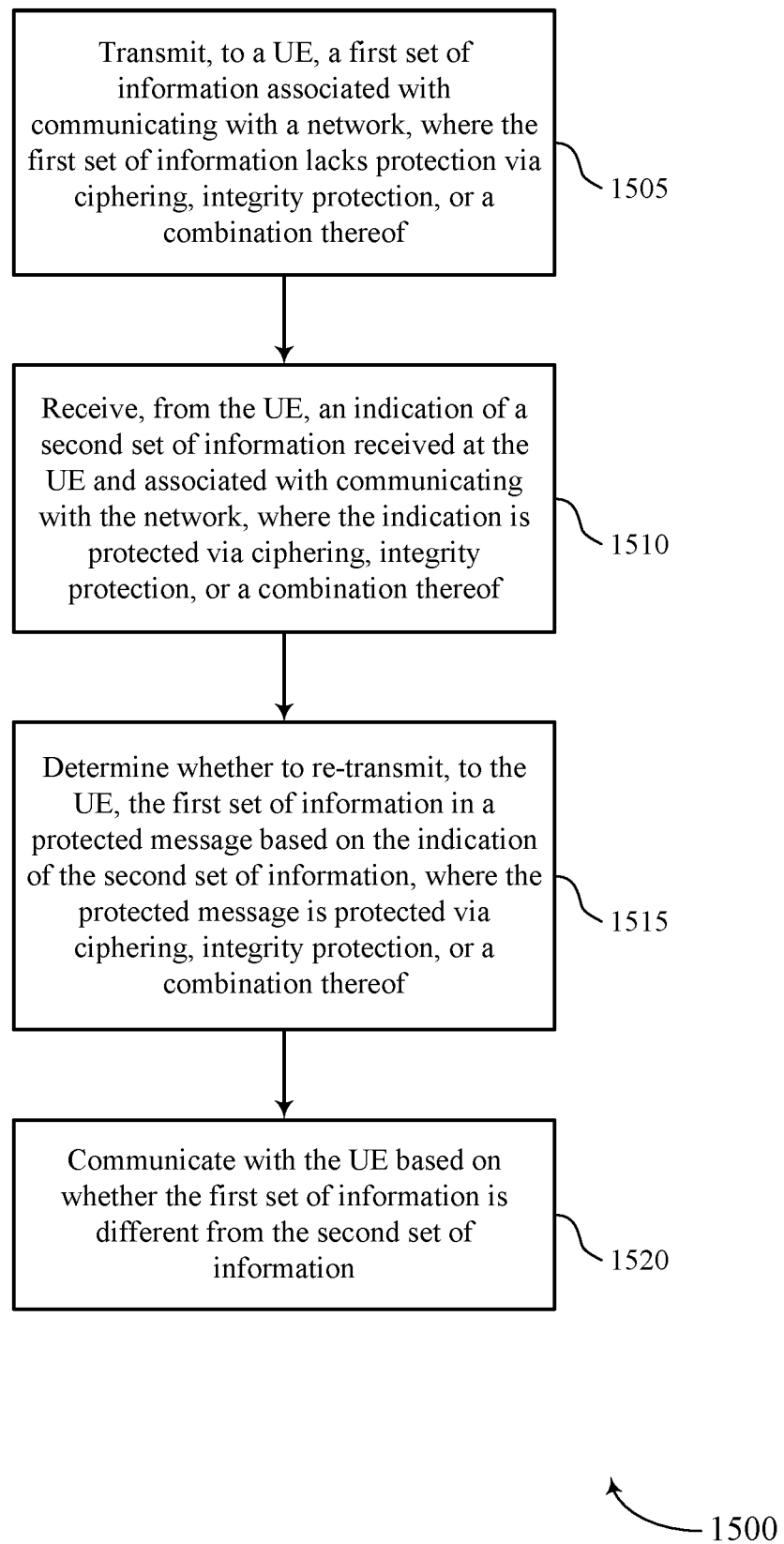

FIG. 15 shows a flowchart illustrating a method 1500 that supports information protection to detect fake base stations in accordance with aspects of the present disclosure. The operations of method 1500 may be implemented by a base station 105 or its components as described herein. For example, the operations of method 1500 may be performed by a base station information protection manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1505, the base station may transmit, to a UE, a first set of information associated with communicating with a network, where the first set of information lacks protection via ciphering, integrity protection, or a combination thereof. The operations of 1505 may be performed according to the methods described herein. In some examples, aspects of the operations of 1505 may be performed by an unprotected transmission component as described with reference to FIGS. 9 through 12.

At 1510, the base station may receive, from the UE, an indication of a second set of information received at the UE and associated with communicating with the network, where the indication is protected via ciphering, integrity protection, or a combination thereof. The operations of 1510 may be performed according to the methods described herein. In some examples, aspects of the operations of 1510 may be performed by a protected indication component as described with reference to FIGS. 9 through 12.

At 1515, the base station may determine whether to re-transmit, to the UE, the first set of information in a protected message based on the indication of the second set of information, where the protected message is protected via ciphering, integrity protection, or a combination thereof. The operations of 1515 may be performed according to the methods described herein. In some examples, aspects of the operations of 1515 may be performed by a re-transmission determination component as described with reference to FIGS. 9 through 12.

At 1520, the base station may communicate with the UE based on whether the first set of information is different from the second set of information. The operations of 1520 may be performed according to the methods described herein. In some examples, aspects of the operations of 1520 may be performed by a communication component as described with reference to FIGS. 9 through 12.

Figure 16:
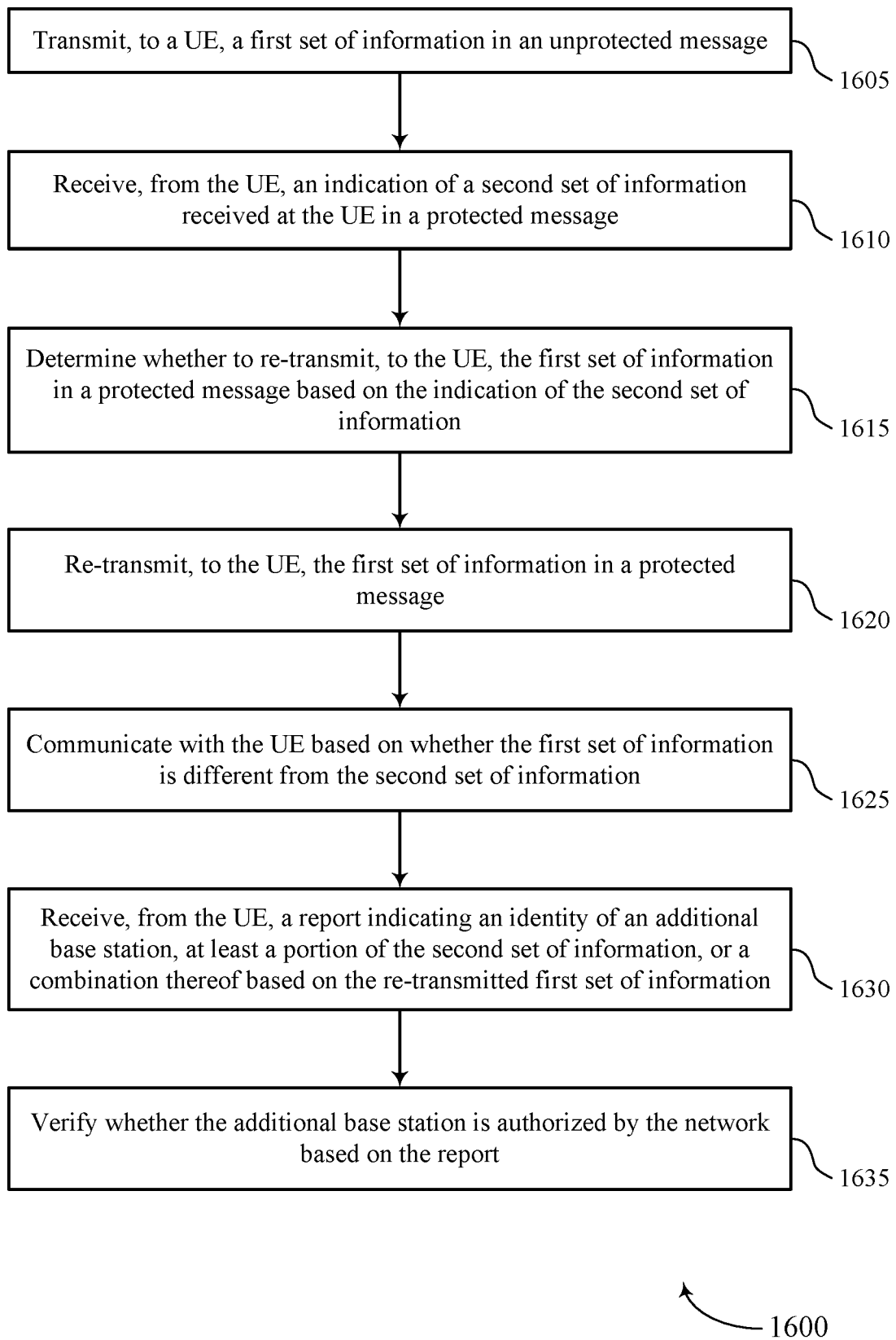

FIG. 16 shows a flowchart illustrating a method 1600 that supports information protection to detect fake base stations in accordance with aspects of the present disclosure. The operations of method 1600 may be implemented by a base station 105 or its components as described herein. For example, the operations of method 1600 may be performed by a base station information protection manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may transmit, to a UE, a first set of information associated with communicating with a network, where the first set of information lacks protection via ciphering, integrity protection, or a combination thereof. The operations of 1605 may be performed according to the methods described herein. In some examples, aspects of the operations of 1605 may be performed by an unprotected transmission component as described with reference to FIGS. 9 through 12.

At 1610, the base station may receive, from the UE, an indication of a second set of information received at the UE and associated with communicating with the network, where the indication is protected via ciphering, integrity protection, or a combination thereof. The operations of 1610 may be performed according to the methods described herein. In some examples, aspects of the operations of 1610 may be performed by a protected indication component as described with reference to FIGS. 9 through 12.

At 1615, the base station may determine whether to re-transmit, to the UE, the first set of information in a protected message based on the indication of the second set of information, where the protected message is protected via ciphering, integrity protection, or a combination thereof. The operations of 1615 may be performed according to the methods described herein. In some examples, aspects of the operations of 1615 may be performed by a re-transmission determination component as described with reference to FIGS. 9 through 12.

At 1620, the base station may re-transmit the first set of information in a protected message (e.g., an RRC re-configuration message) based on the determining. The operations of 1620 may be performed according to the methods described herein. In some examples, aspects of the operations of 1620 may be performed by a re-transmission determination component as described with reference to FIGS. 9 through 12.

At 1625, the base station may communicate with the UE based on whether the first set of information is different from the second set of information. The operations of 1625 may be performed according to the methods described herein. In some examples, aspects of the operations of 1625 may be performed by a communication component as described with reference to FIGS. 9 through 12.

At 1630, the base station may receive, from the UE, a report indicating an identity of an additional base station, at least a portion of the second set of information, or a combination thereof based on the re-transmitted first set of information. The operations of 1630 may be performed according to the methods described herein. In some examples, aspects of the operations of 1630 may be performed by a base station verification component as described with reference to FIGS. 9 through 12.

At 1635, the base station may verify whether the additional base station is authorized by the network based on the report. The operations of 1635 may be performed according to the methods described herein. In some examples, aspects of the operations of 1635 may be performed by a base station verification component as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
    receiving, from a base station, a first set of information associated with communicating with a network, the first set of information comprising a first master information block, a first set of system information blocks, or a combination thereof, wherein the first set of information lacks protection via ciphering, integrity protection, or a combination thereof;
    transmitting, to the base station, an indication of the first set of information, wherein the indication is protected via ciphering, integrity protection, or a combination thereof;
    determining authenticity of the first set of information based at least in part on whether a second set of information associated with communicating with the network is received from the base station that is different from the first set of information, the second set of information comprising a second master information block, a second set of system information blocks, or a combination thereof; and
    communicating with the network based at least in part on the determining.

2. The method of claim 1, further comprising:
    receiving, from the base station, the second set of information, wherein the second set of information is protected via ciphering, integrity protection, or a combination thereof; and
    comparing the second set of information with the first set of information, wherein the determining is based at least in part on the comparing.

3. The method of claim 2, wherein the second set of information is received in a radio resource control reconfiguration message.

4. The method of claim 1, wherein the indication comprises a hash value based at least in part on the first set of information and a system frame number value associated with the first set of information, the method further comprising:
receiving, from the base station, the second set of information if the second set of information is different from the first set of information.

5. The method of claim 1, wherein the indication comprises a request for the second set of information, the method further comprising:
receiving, from the base station, the second set of information based at least in part on the request for the second set of information.

6. The method of claim 1, wherein:
the UE comprises an unregistered UE without a valid non-access stratum security context; and
the indication of the first set of information is transmitted in an access stratum security mode complete message.

7. The method of claim 1, further comprising:
receiving a UE-specific key for an initial access stratum message, wherein the UE-specific key is based at least in part on one or more identifiers of the UE.

8. The method of claim 7, wherein the UE comprises a registered UE with a valid non-access stratum security context, and wherein transmitting the indication of the first set of information comprises:
security protecting the indication of the first set of information based at least in part on the UE-specific key, wherein the security protecting comprises encrypting the indication of the first set of information, integrity protecting the indication of the first set of information, or a combination thereof.

9. The method of claim 8, wherein protecting the indication of the first set of information based at least in part on the UE-specific key further comprises:
deriving a temporary encryption key for the initial access stratum message based at least in part on the UE-specific key, a pseudo-random number, an algorithm identifier, or a combination thereof;
encrypting the indication of the first set of information using the temporary encryption key and a system frame number value associated with the first set of information; and
transmitting, to the base station, an indication of the system frame number value and the pseudo-random number, the algorithm identifier, or a combination thereof.

10. The method of claim 8, further comprising:
receiving an updated UE-specific key for the initial access stratum message, wherein the updated UE-specific key is based at least in part on the one or more identifiers of the UE, a key index, or a combination thereof.

11. The method of claim 8, wherein the indication of the first set of information is transmitted in a radio resource control connection message.

12. The method of claim 7, further comprising:
receiving a key index value associated with the UE-specific key; and
transmitting the key index value with the indication of the first set of information.

13. The method of claim 7, further comprising:
detecting an additional base station;
transmitting, to the additional base station, an initial radio resource control connection setup message indicating detection of the additional base station, wherein the initial radio resource control connection setup message is security protected based at least in part on the UE-specific key; and
determining whether the additional base station is an authorized base station of the network based at least in part on the initial radio resource control connection setup message.

14. The method of claim 7, wherein the one or more identifiers of the UE comprise a globally unique temporary identity, a serving temporary mobile subscriber identity, a temporary mobile subscriber identity, or a combination thereof.

15. The method of claim 7, wherein the UE-specific key is received in a secure non-access stratum message.

16. The method of claim 1, wherein:
the determining comprises determining that the first set of information is authentic; and
the communicating comprises communicating with the network via the base station based at least in part on the determining that the first set of information is authentic.

17. The method of claim 1, wherein:
the determining comprises determining that the first set of information is inauthentic; and
the communicating comprises:
detaching from the base station based at least in part on the determining that the first set of information is inauthentic;
reattaching to an additional base station; and
communicating with the network via the additional base station.

18. The method of claim 17, further comprising:
reporting, to the additional base station, an identity of the base station, at least a portion of the first set of information, or a combination thereof based at least in part on the determining that the first set of information is inauthentic.

19. The method of claim 1, further comprising:
receiving, from the base station, an indication that security protection for the first set of information is enabled, wherein the indication is received in a non-access stratum security mode command message.

20. The method of claim 1, wherein the indication of the first set of information is integrity protected.

21. A method for wireless communications at a base station, comprising:
transmitting, to a user equipment (UE), a first set of information associated with communicating with a network, the first set of information comprising a first master information block, a first set of system information blocks, or a combination thereof, wherein the first set of information lacks protection via ciphering, integrity protection, or a combination thereof;
receiving, from the UE, an indication of a second set of information received at the UE and associated with communicating with the network, wherein the indication is protected via integrity protection, the second set of information comprising a second master information block, a second set of system information blocks, or a combination thereof;
determining whether to re-transmit, to the UE, the first set of information in a protected message based at least in part on the indication of the second set of information, wherein the protected message is protected via ciphering, integrity protection, or a combination thereof; and
communicating with the UE based at least in part on whether the first set of information is different from the second set of information.

22. The method of claim 21, wherein the indication of the second set of information comprises a hash value based at least in part on the second set of information and a system frame number value associated with the second set of information, the method further comprising:
  identifying the second set of information based at least in part on the hash value; and
  determining to re-transmit, to the UE, the first set of information in the protected message if the second set of information is different from the first set of information.

23. The method of claim 21, wherein the indication of the second set of information comprises a request for the second set of information, wherein the first set of information corresponds to the second set of information, the method further comprising:
  re-transmitting, to the UE, the first set of information in the protected message based at least in part on the request.

24. The method of claim 21, wherein:
  the UE comprises an unregistered UE without a valid non-access stratum security context; and
  the indication of the second set of information is received in an access stratum security mode complete message.

25. The method of claim 21, wherein:
  the UE comprises a registered UE with a valid non-access stratum security context; and
  the indication of the second set of information is protected based at least in part on a UE-specific key for an initial access stratum message.

26. The method of claim 25, further comprising:
  receiving, from a network entity of the network, a master key for the initial access stratum message;
  receiving, from the UE, an indication of a system frame number value, a pseudo-random number, an algorithm identifier, or a combination thereof;
  deriving the UE-specific key using the master key and one or more identifiers of the UE;
  deriving a temporary encryption key for the initial access stratum message based at least in part on the UE-specific key and the system frame number value, the pseudo-random number, the algorithm identifier, or a combination thereof; and
  decrypting the indication of the second set of information using the temporary encryption key.

27. An apparatus for wireless communications at a user equipment (UE), comprising:
  a processor;
  memory in electronic communication with the processor; and
  instructions stored in the memory and executable by the processor to cause the apparatus to:
    receive, from a base station, a first set of information associated with communicating with a network, the first set of information comprising a first master information block, a first set of system information blocks, or a combination thereof, wherein the first set of information lacks protection via ciphering, integrity protection, or a combination thereof;
    transmit, to the base station, an indication of the first set of information, wherein the indication is protected via integrity protection;
    determine authenticity of the first set of information based at least in part on whether a second set of information associated with communicating with the network is received from the base station that is different from the first set of information, the second set of information comprising a second master information block, a second set of system information blocks, or a combination thereof; and
    communicate with the network based at least in part on the determining.

28. An apparatus for wireless communications at a base station, comprising:
  a processor;
  memory in electronic communication with the processor; and
  instructions stored in the memory and executable by the processor to cause the apparatus to:
    transmit, to a user equipment (UE), a first set of information associated with communicating with a network, the first set of information comprising a first master information block, a first set of system information blocks, or a combination thereof, wherein the first set of information lacks protection via ciphering, integrity protection, or a combination thereof;
    receive, from the UE, an indication of a second set of information received at the UE and associated with communicating with the network, wherein the indication is protected via ciphering, integrity protection, or a combination thereof;
    determine whether to re-transmit, to the UE, the first set of information in a protected message based at least in part on the indication of the second set of information, wherein the protected message is protected via integrity protection, the second set of information comprising a second master information block, a second set of system information blocks, or a combination thereof; and
    communicate with the UE based at least in part on whether the first set of information is different from the second set of information.

* * * * *